(12) United States Patent
Engelhardt et al.

(10) Patent No.: US 11,669,557 B2
(45) Date of Patent: *Jun. 6, 2023

(54) ITERATIVE IMAGE SEARCH ALGORITHM INFORMED BY CONTINUOUS HUMAN-MACHINE INPUT FEEDBACK

(71) Applicant: Ask Sydney, LLC, Dix Hills, NY (US)

(72) Inventors: Sydney Epstein Engelhardt, Dix Hills, NY (US); Paul Lawrence Epstein, Dix Hills, NY (US)

(73) Assignee: Ask Sydney, LLC, Dix Hills, NY (US)

( * ) Notice: Subject to any disclaimer, the term of this patent is extended or adjusted under 35 U.S.C. 154(b) by 441 days.

This patent is subject to a terminal disclaimer.

(21) Appl. No.: 16/596,393

(22) Filed: Oct. 8, 2019

(65) Prior Publication Data

US 2020/0042546 A1 Feb. 6, 2020

Related U.S. Application Data

(63) Continuation of application No. 15/688,362, filed on Aug. 28, 2017, now Pat. No. 10,467,267, which is a continuation of application No. 15/070,371, filed on Mar. 15, 2016, now Pat. No. 9,779,160, which is a continuation of application No. 14/827,205, filed on Aug. 14, 2015, now Pat. No. 9,323,786.

(60) Provisional application No. 62/037,788, filed on Aug. 15, 2014.

(51) Int. Cl.
*G06Q 30/00* (2023.01)
*G06F 16/33* (2019.01)
(Continued)

(52) U.S. Cl.
CPC ........ *G06F 16/334* (2019.01); *G06F 3/04842* (2013.01); *G06F 16/51* (2019.01);
(Continued)

(58) Field of Classification Search
CPC .... G06F 16/334; G06F 16/51; G06F 16/5866; G06F 16/58; G06F 3/04842; G06Q 30/0631; H04L 67/306; H04W 4/021
(Continued)

(56) References Cited

U.S. PATENT DOCUMENTS 6,604,103 B1   8/2003  Wolfe
8,560,398 B1 * 10/2013  Gregov ............... G06Q 30/06
                                          705/26.2

(Continued)

OTHER PUBLICATIONS

Milicevic et al.: "Social tagging in recommender systems: a survey of the state-of-the-art and possible extensions", Springer Science+Business Media B.V. 2010; Jan. 21, 2010; 24 pgs.
(Continued)

*Primary Examiner* — Robert M Pond
(74) *Attorney, Agent, or Firm* — Nixon Peabody LLP; Justin D. Swindells

(57) ABSTRACT

System and computer-implemented method of analyzing tags associated with a sequence of images presented to a user to present a current interest of the user is disclosed. An image from among a plurality of images is presented on an electronic display. The image is associated with a set of tags. An input is received indicating a user's preference for the image. A plurality of tags is processed based on the preference and the set of tags to determine a next set of tags from the plurality of tags. A next image is determined from the plurality of images based on the next set of tags. The next image represents a physical object, different from a physical object represented by the previous image. A sequence of images is generated by repeating the above process with the next image in place of the previous image for present a user's current interest.

18 Claims, 10 Drawing Sheets

(51) Int. Cl.
  *H04L 67/306* (2022.01)
  *G06F 3/04842* (2022.01)
  *G06Q 30/0601* (2023.01)
  *G06F 16/51* (2019.01)
  *G06F 16/58* (2019.01)
  *H04W 4/021* (2018.01)

(52) U.S. Cl.
  CPC .......... *G06F 16/58* (2019.01); *G06F 16/5866* (2019.01); *G06Q 30/0631* (2013.01); *H04L 67/306* (2013.01); *H04W 4/021* (2013.01)

(58) Field of Classification Search
  USPC ..................................................... 705/26, 27
  See application file for complete search history.

(56) References Cited

U.S. PATENT DOCUMENTS

| | | | |
|---|---|---|---|
| 9,152,624 | B1 | 10/2015 | Krallman |
| 9,710,841 | B2* | 7/2017 | Ainsworth, III ... G06Q 30/0643 |
| 2007/0078832 | A1 | 4/2007 | Ott |
| 2007/0266025 | A1 | 11/2007 | Wagner |
| 2008/0147611 | A1 | 6/2008 | Bennett |
| 2009/0254534 | A1 | 10/2009 | Garbow |
| 2010/0121807 | A1 | 5/2010 | Perrier |
| 2011/0208617 | A1 | 8/2011 | Weiland |
| 2012/0072302 | A1 | 3/2012 | Chen |
| 2012/0084731 | A1 | 4/2012 | Filman |
| 2012/0316960 | A1 | 12/2012 | Yang |
| 2013/0151612 | A1 | 6/2013 | Dunn |
| 2014/0143086 | A1 | 5/2014 | Birsin |
| 2016/0048537 | A1 | 2/2016 | Epstein |

OTHER PUBLICATIONS

International Search Report and Written Opinion of the International Searching Authority, PCT/US2015/045391, dated Oct. 28, 2015, 7 pgs.

International Search Report and Written Opinion of the International Searching Authority, PCT/US17/19674, dated May 19, 2017, 9 pgs.

Sharma, V. & Karnick, H., "Automatic tagging and retrieval of E-Commerce products based on visual features," Proceedings of the NAACL-HLT 2016, pp. 22-28, San Diego, California, Jun. 12-17, 2016 (7 pages).

* cited by examiner

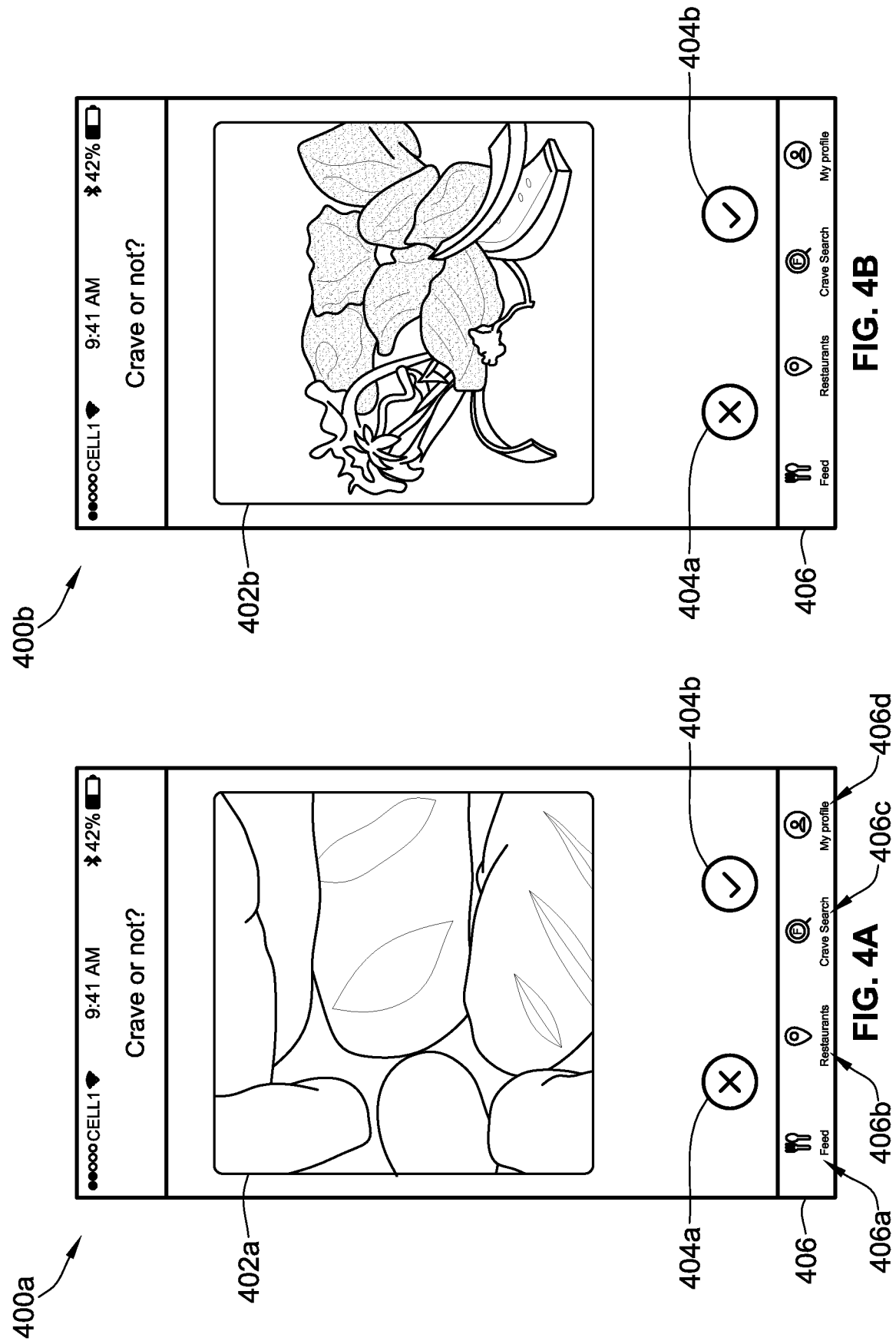

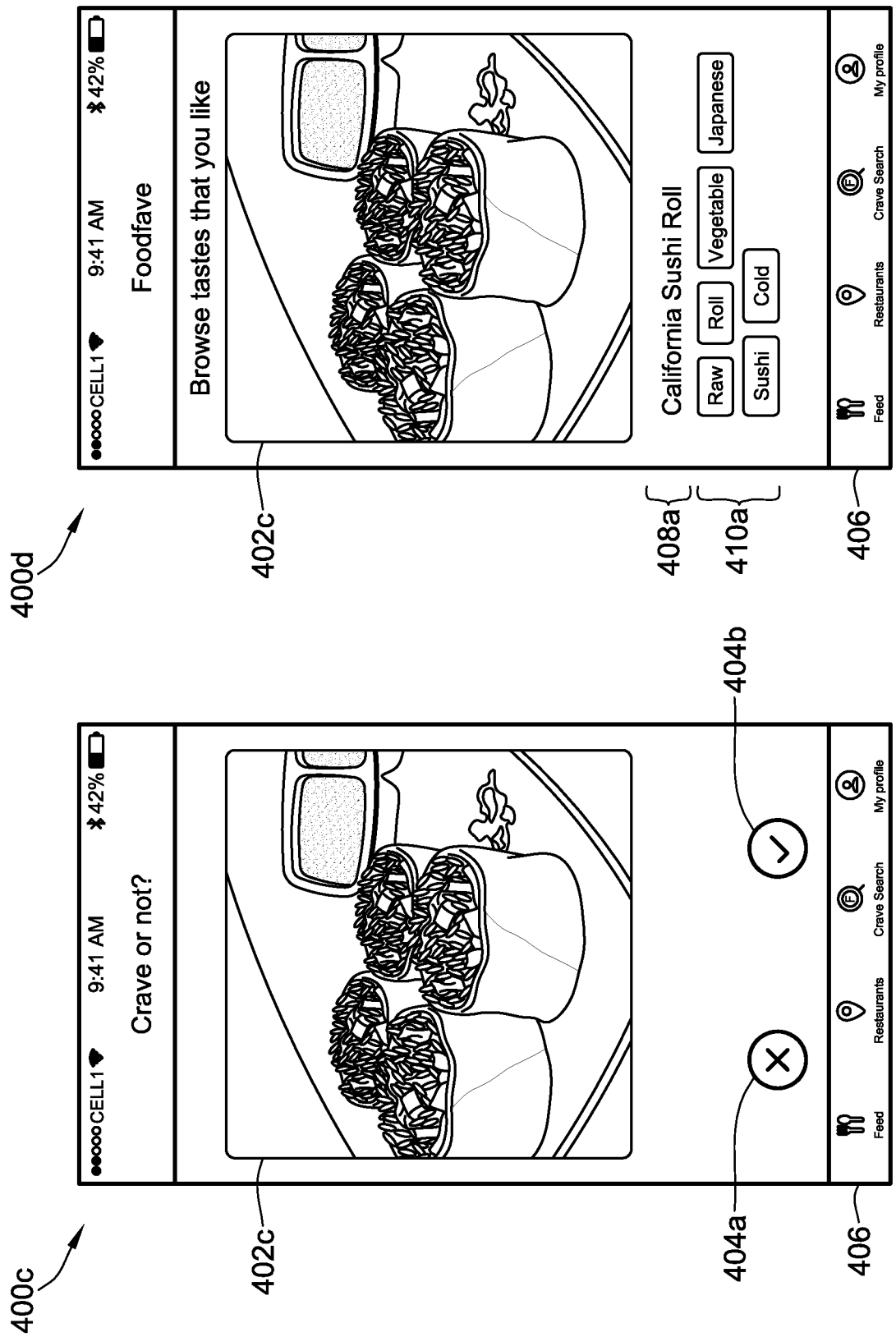

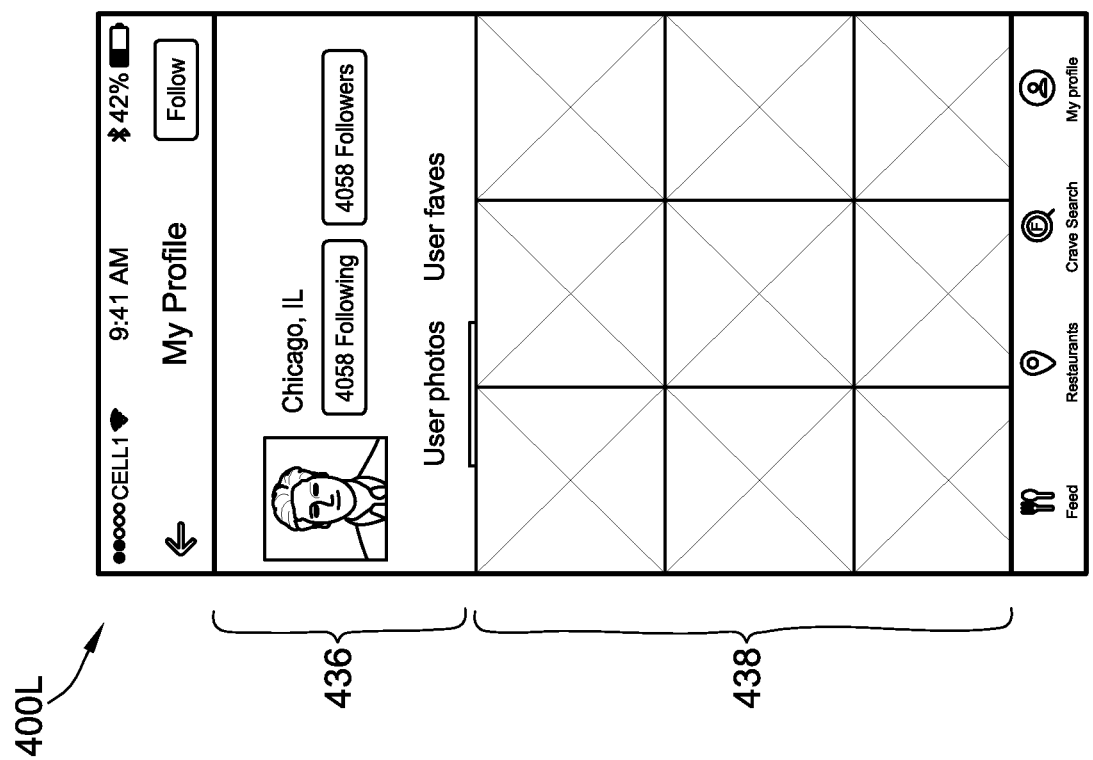
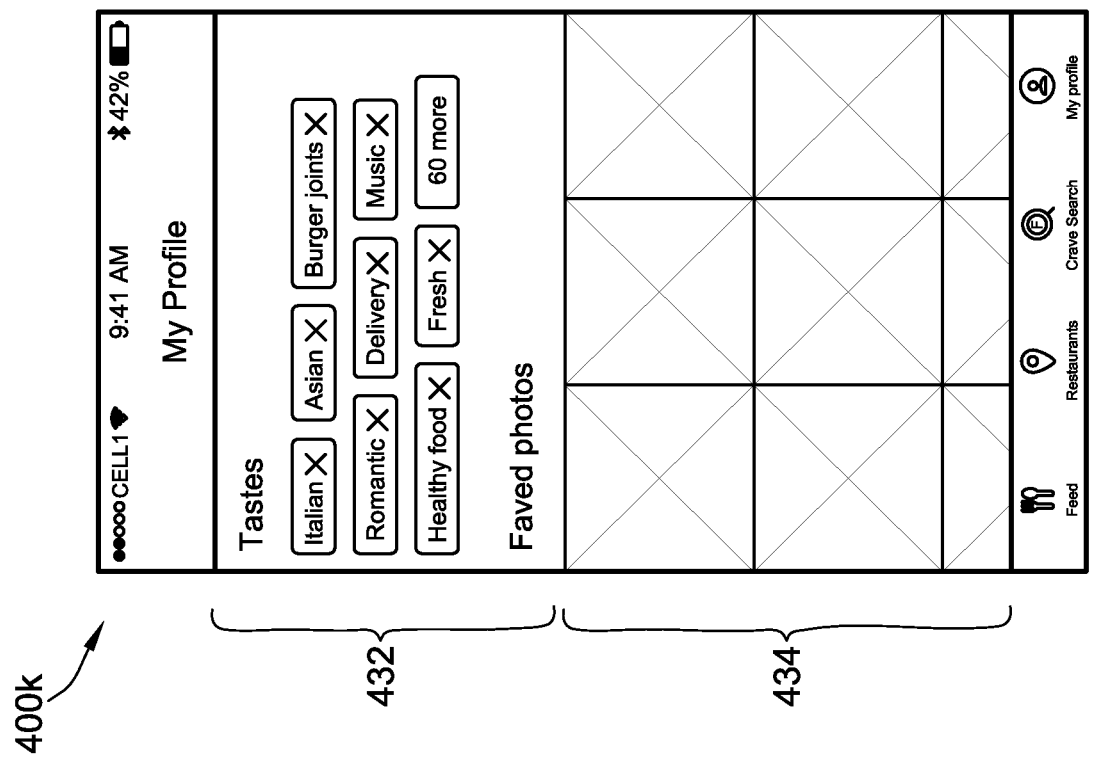
FIG. 4L
FIG. 4K

ITERATIVE IMAGE SEARCH ALGORITHM INFORMED BY CONTINUOUS HUMAN-MACHINE INPUT FEEDBACK

CROSS-REFERENCE TO RELATED APPLICATIONS

This application is a continuation of U.S. patent application Ser. No. 15/688,362, filed Aug. 28, 2017, now allowed, which is a continuation of U.S. patent application Ser. No. 15/070,371, filed Mar. 15, 2016, now U.S. Pat. No. 9,779,160, issued Oct. 3, 2017, which is a continuation of U.S. patent application Ser. No. 14/827,205, filed Aug. 14, 2015, now U.S. Pat. No. 9,323,786, issued Apr. 26, 2016, which claims priority to and the benefit of U.S. Provisional Application No. 62/037,788, filed Aug. 15, 2014, all of which are hereby incorporated by reference in their entireties.

FIELD OF THE PRESENT DISCLOSURE

Aspects of the present disclosure relate generally to systems and methods of analyzing tags associated with a sequence of images presented to a user to guide a user to a current interest.

BACKGROUND

There exist a multitude of applications, both Internet-based applications and smartphone/tablet-based applications, that make recommendations for users based on analyzing a user's history. A user's history can include or reflect, for example, choices the user previously made based on the user's preferences. Although a user's preferences can be constant as a whole over a long period of time, the generality of the preferences allow for a user's current specific preference to be less defined. For example, user's preferences with respect to food are fairly constant. A user may prefer, for example, Italian food and Chinese food. A history of the user's food preferences captures this general information and may allow applications to provide a generalized recommendation for what a user may want now or in the future. However, a user's current preferences can be more granular than what can be captured by recommendation systems that rely on analyzing a user's history to make a current recommendation at a specific moment in time when the user may be craving something in particular. Thus, the granularity of a user's current, specific preference also allows for specific current interests than cannot accurately be predicted based on a user's history alone. For example, with respect to food, a user can experience cravings—where a user desires a specific type of food among all of the types of food that the user normally enjoys. Therefore, current applications do not help a user determine what the user's current interest is despite the applications' having access to the user's history. Moreover, although the user may know that he or she wants something, the particular object of the user's interest may be unknown even to the user until one of the user's senses is inspired or provoked. Further, thinking by the user of what the users' current interest is, alone, may not help the user in defining his or her current interest.

According to aspects of the present disclosure, a system and computer-implemented method are disclosed that guide a user to his or her current interest based on a sequential presentation of images representative of possible physical objects of interest.

SUMMARY

An aspect of the present disclosure includes a computer-implemented method of analyzing tags associated with a sequence of images presented to a user in response to human-machine inputs made by the user to present a current interest of the user, such as a food craving. The method includes presenting, via a display of an electronic device, one image from among a plurality of images. The one image represents a physical object and is associated with one set of tags from a plurality of tags. Each tag of the one set of tags describes or characterizes attributes of the physical object represented by the one image. The method further includes receiving, via a user interface of the electronic device, an input by the user indicating a preference for the physical object represented by the one image. The method also includes processing, by one or more computer devices, the plurality of tags based on the preference and the one set of tags to determine a next set of tags from the plurality of tags. The method further includes determining, by the one or more computer devices, a next image from the plurality of images associated with the next set of tags. The next image represents a physical object that is different from the physical object represented by the one image, and the next set of tags describes or characterizes attributes of the physical object represented by the next image. The method also includes generating the sequence of images by repeating the presenting, the receiving, the processing, and the determining with the next image in place of the one image during a session of presenting the current interest of the user.

An additional aspects of the present disclosure includes one or more computer-readable, non-transitory, storage media encoding machine-readable instructions that, when executed by one or more computers, cause operations to be carried out. The operations include presenting, via a display of an electronic device, one image from among a plurality of images. The one image represents a physical object and is associated with one set of tags from a plurality of tags. Each tag of the one set of tags describes or characterizes attributes of the physical object represented by the one image. The operations include further include receiving, via a user interface of the electronic device, an input by the user indicating a preference for the physical object represented by the one image. The operations also include processing, by one or more computer devices, the plurality of tags based on the preference and the one set of tags to determine a next set of tags from the plurality of tags. The operations further include determining, by the one or more computer devices, a next image from the plurality of images associated with the next set of tags. The next image represents a physical object that is different from the physical object represented by the one image, and the next set of tags describes or characterizes attributes of the physical object represented by the next image. The operations also include generating the sequence of images by repeating the presenting, the receiving, the processing, and the determining with the next image in place of the one image during a session of presenting the current interest of the user.

Further aspects of the present disclosure include a computer-implemented method of automatically recommending restaurants proximate a user based on a sequence of the user's expressed food preferences. The method includes receiving a geographic location associated with the user, and retrieving, using one or more computer devices, a first set of digital photographs, each depicting a different food, and associated with a plurality of tags indicating a genre of the food featured in the corresponding photograph, a description of the food featured in the corresponding photograph, and a food establishment where the corresponding photograph of the food was taken. The food establishment is located within a predetermined proximity of the geographic location. The method further includes displaying, by a display device, the first set of photographs over one or multiple frames on the display device. For each of at least some of the first set of photographs, the method includes receiving via a user input device one of at least two input options, the at least two input options including a favorable indication of a preference for the food featured in the corresponding one of the at least some of the first set of photographs or an unfavorable indication of a disinclination for the food featured in the corresponding one of the at least some of the first set of photographs. The method also includes storing, for each of the at least some of the first set of photographs, in a memory storage device, a record indicating a relationship between the received input option and the tags associated with each corresponding one of the at least some of the first set of photographs, to produce a plurality of records on the memory storage device. The method further includes analyzing, using the computer or another computer, the records to identify a genre of food having at least a probable chance of being liked by the user, and retrieving, using the computer or another computer, a further digital photograph depicting a food, the further digital photograph being associated with a tag indicating a genre of the food featured in the further photograph and having at least a probable correlation with or matching the identified genre. The method also includes using the received geographic location, the computer or another computer identifying at least one food establishment, which is located in a predetermined proximity to the received geographic location and which serves the identified genre of food, and displaying, by the display device, information regarding the at least one identified food establishment.

Additional aspects of the present disclosure will be apparent to those of ordinary skill in the art in view of the detailed description of various embodiments, which is made with reference to the drawings, a brief description of which is provided below.

BRIEF DESCRIPTION OF THE DRAWINGS

FIG. 4A illustrates a user interface of a computer-implemented method or process of analyzing tags associated with a sequence of images presented to a user to present a current interest of the user according to aspects of the present disclosure.

FIG. 4B illustrates another user interface of a computer-implemented method or process of analyzing tags associated with a sequence of images presented to a user to present a current interest of the user according to aspects of the present disclosure.

FIG. 4C illustrates another user interface of a computer-implemented method or process of analyzing tags associated with a sequence of images presented to a user to present a current interest of the user according to aspects of the present disclosure.

FIG. 4D illustrates another user interface of a computer-implemented method or process of analyzing tags associated with a sequence of images presented to a user to present a current interest of the user according to aspects of the present disclosure.

FIG. 4K illustrates a user interface for visualizing a profile of a user according to aspects of the present disclosure.

FIG. 4L illustrates a user interface for visualizing a profile of a user according to aspects of the present disclosure.

DETAILED DESCRIPTION

Figure 1:
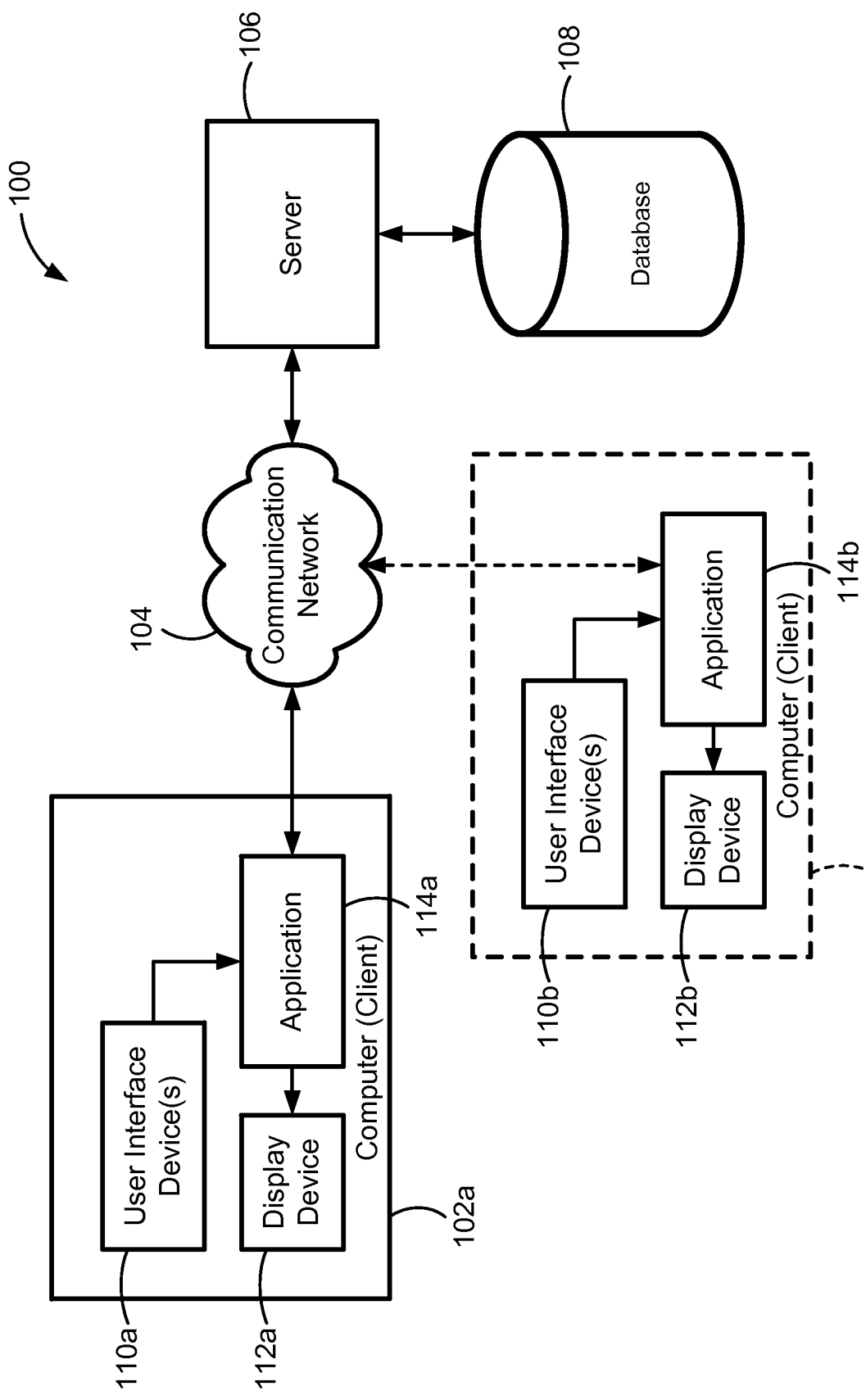
FIG. 1 is a functional block diagram of a computer system according to an aspect of the present disclosure.

While this disclosure is susceptible of embodiment in many different forms, there is shown in the drawings and will herein be described in detail example implementations of the inventions and concepts herein with the understanding that the present disclosure is to be considered as an exemplification of the principles of the inventions and concepts and is not intended to limit the broad aspect of the disclosed implementations to the examples illustrated. For purposes of the present detailed description, the singular includes the plural and vice versa (unless specifically disclaimed); the words "and" and "or" shall be both conjunctive and disjunctive; the word "all" means "any and all"; the word "any" means "any and all"; and the word "including" means "including without limitation."

A (software) module can refer to computer-readable object code that executes a software sub-routine or program, which corresponds to instructions executed by any microprocessor or microprocessing device to perform described functions, acts, or steps. Any of the methods or algorithms or functions described herein can include non-transitory machine or computer-readable instructions for execution by: (a) an electronic processor, (b) an electronic controller, and/or (c) any other suitable electronic processing device. Any algorithm, software module, software component, software program, routine, sub-routine, or software application, or method disclosed herein can be embodied as a computer program product having one or more non-transitory tangible medium or media, such as, for example, a flash memory, a CD-ROM, a floppy disk, a hard drive, a digital versatile disk (DVD), or other electronic memory devices, but persons of ordinary skill in the art will readily appreciate that the entire algorithm and/or parts thereof could alternatively be executed by a device other than an electronic controller and/or embodied in firmware or dedicated hardware in a well-known manner (e.g., it may be implemented by an application specific integrated circuit (ASIC), a programmable logic device (PLD), a field programmable logic device (FPLD), discrete logic, etc.).

As discussed above, there currently exist recommendation systems that are unable to account for a user's current (i.e., contemporaneous) interest or preference based on the breadth of the user's interest, despite, for example, the recommendation systems having access to information regarding the user's history. The granularity of a user's current preference relative to, for example, a user's historical preferences with respect to the subject matter relating to the preference prohibits current recommendation systems from being able to estimate or present the user's current interest at the moment in time the user may be craving something. At best, current recommendation systems merely provide a one-time guess regarding the user's current preference. Moreover, within the realm of food, in particular, current applications exist that provide information regarding broad categories of food that are available within the user's current location. However, the amount of information provided by such applications may amount to information overload. The information overload does not allow a user to determine a specific food dish in which the user is currently interested. What is needed, inter alia, is a guided, iterative searching solution that repeatedly and dynamically adjusts searching criteria in response to human-machine inputs made by the user to arrive at a recommendation that will satisfy the user's contemporaneous craving at the conclusion of the search session. In this way, both human and machine are necessary partners in this search strategy. Only the human can, using his or her subjective senses, ascertain from an image how a user feels about what is presented in the image. However, to satisfy an immediate craving, the machine is needed to help the human user arrive at a recommendation quickly, within less than a minute or so. The Internet, cellular data and wireless technology, and smartphones have given users instant access and visibility to a myriad of options, but in some respects, this access and visibility is as much a blessing as it is a curse. With so many choices and options readily available, a new programmed machine is needed to help users find relevant information quickly to satisfy needs that are fleeting and must be satisfied quickly.

Accordingly, aspects of the present disclosure provide for systems and methods of analyzing tags associated with a sequence of images presented to a user to guide a user to a current interest. The systems and methods allow for the presentation of a sequence of images to the user. Each image represents a physical object that the user can obtain through a physical entity that provides the physical object. In the realm of food, for example, the physical object can represent a food dish and the physical entity can represent a restaurant or store or food establishment (e.g., market, grocery, store, etc.) that offers the food dish. A food dish as used herein includes any edible item or combination of edible items that can be consumed (e.g., eaten or drunk) by animals, including drinks such as bubble tea, milkshakes, or cocktails. Each image within the sequence is associated with a set of tags that describe the physical object. Based on a user's preference for each tag, a new image is presented to generate the sequence of images. The new image is selected based on the set of tags associated with the image that describe the physical object represented by the image, and how the set of tags for the new image relate to the set of tags for the previous image based on the preference of the previous image. The sequence of presenting images to the user that represent physical objects continues to guide the user into determining a physical object that satisfies or describes the user's current interest. Once the user is presented with an image that represents a physical (tangible) object that the user is currently interested in (e.g., craving), the systems and methods allow for the user to select the image (e.g., a digital photograph) to be presented information on how to obtain (e.g., consume) items depicted in the physical image. In the realm of food as a human interest, for example, the user can be directed to an Internet web site of a physical entity such as a restaurant or other food establishment that serves or offers food at which the user can purchase the dish of food and optionally consume at the food establishment. According to some embodiments, the user can be directed to an electronic user interface of a software application, independent from the web site of the restaurant, at which the user can purchase the dish of food, to provide additional convenience to the process of obtaining the food dish.

FIG. 1 is a functional block diagram of a system 100 according to an aspect of the present disclosure. First, the general components of the system 100 will be introduced, followed by examples. The system 100 includes one or more electronic computers (clients) 102a, 102b. Reference numbers used herein without a letter can refer to a specific one of the plurality of items, a subset of multiple items of the plurality of items, or all items of the plurality of items so numbered with the same reference number. Thus, by way of example, the reference number 102 can refer to the computer 102a, the computer 102b, or both of the computers 102a and 102b, as shown in FIG. 1. The one or more computers 102a, 102b connect to a communication network 104, such as the Internet. However, the communication network 104 can be any type of electronic communication network. A computer as used herein includes any one or more electronic devices having a central processing unit (CPU) or controller or microprocessor or microcontroller as understood by those skilled in the art of electronic computers. Examples of computers include tablet computers, laptop computers, desktop computers, servers, smartphones, a wearable electronic device such as a watch, an eyeglass, an article of clothing, or a wristband, and personal digital assistants (PDAs). The term computer as used herein can include a system of electronic devices coupled together to form what is conventionally referred to as a computer. For example, one or more input devices, such as a keyboard or a mouse, and one or more electronic display devices, such as a video display, can be coupled to a housing that houses the CPU or controller. Or, all components of the computer can be integrated into a single housing, such as in the case of a tablet computer or a smartphone. The one or more computers 102a, 102b conventionally include or are operatively coupled to one or more memory devices that store digital information therein, including non-transitory machine-readable instructions and data.

The one or more computers 102a, 102b include user interface devices 110a, 110b. Each user interface device 110a, 110b corresponds to a human-machine interface (HMI) that accepts inputs made by a human (e.g., via touch, click, gesture, voice, etc.) and converts those inputs into corresponding electronic signals. Non-limiting examples of user interface devices 110a, 110b include a touchscreen, a keyboard, a mouse, a camera, and a microphone. These are also referred to as human-machine interface devices, because they allow a human to interact with a machine by providing inputs supplied by the human user to the machine.

The one or more computers 102a, 102b also include electronic display devices 112a, 112b that are configured to display information that can be visually perceived. Non-limiting examples of display devices 112a, 112b include an electronic video display, a stereoscopic display, or any electronic display configured to visually portray information including text, static graphics, and moving animations that is perceivable by the human eye. The electronic display devices 112a, 112b display visual information contained in an electronic user interface (UI). The electronic UI can also include selectable elements that are selectable using the one or more HMI devices 110a, 110b. Thus, the electronic UI generally can include a graphical user interface (GUI) component and a human-machine user interface component, via which a human user can select selectable elements displayed on the GUI via the HMI interface.

The one or more computers 102a, 102b also include software applications 114a, 114b. That is, the one or more computers 102a, 102b execute non-transitory machine-readable instructions and data that implement the software applications 114a, 114b. The applications 114a, 114b perform one or more functions on the one or more computers 102a, 102b. The applications 114a, 114b can be various specific types of applications, such as a web browser application or a native application. Within the system 100, the applications 114a, 114b convey information between the one or more computers 102a, 102b and the communication network 104 (e.g., Internet) via a conventional wired or wireless electronic communications interface associated with the one or more computers 102a, 102b. Alternatively, or in addition, the applications 114a, 114b can be a native application. Native applications convey information between the one or more computers 102a, 102b over the communication network 104 to an application server 106. The native applications 114a, 114b conventionally convey information between the one or more computers 102a, 102b over the communication network 104 via a conventional wired or wireless electronic communications interface associated with the one or more computers 102a, 102b.

As described above, the server 106 is also coupled to the communication network 104. The server 106 is a type of computer, and has a well understood meaning in the art. The server 106 can be, for example, a web browser server, such as in the case of applications 114a, 114b being web browser applications. Or, the server 106 can be, for example, a native application server, such as in the case of applications 114a, 114b being native applications.

An electronic database 108 is incorporated in or is coupled to the server 106. The database 108 is a form of a memory device or a data store, and stores electronic data for retrieval and archival relative to the server 106. Both the server 106 and the one or more applications 114a, 114b communicate information according to one or more protocols, such as the hypertext transfer protocol (HTTP) in the case of the communication network 104 being the Internet. In the case of the communication network 104 being a private local area network (LAN), instead of the Internet, any other communications protocol can be used instead of the HTTP. For example, native applications can instead communicate using a proprietary or conventional communications protocol to pass information between the one or more computers 102a, 102b and the server 106.

Although the system 100 is shown generally with respect to FIG. 1 as including two computers 102a, 102b, one server 106, and one database 108, the system 100 can include any number of computers 102a, 102b, any number of independent or clustered servers 106 (e.g., server farm or sever cluster), and any number of databases 108. Moreover, some or all functionality of one or more components of the system 100 can be transferred, in whole or in part, to other components of the system 100. By way of example, functionality of the server 106 and/or the database 108 can be transferred, in whole or in part, to the one or more computers 102a, 102b, depending on the functionality and performance of the computers 102a, 102b.

The applications 114a, 114b communicate with the server 106 and the database 108 over the communication network 104 for analyzing tags associated with a sequence of images presented to a user to guide a user to a current interest. The applications 114a, 114b control the user interface devices 110a, 110b and the display devices 112a, 112b to present the images to the user and to receive inputs from the user indicating the user's preferences for the images. The images are communicated over the communication network 104 to the applications 114a, 114b of the one or more computers 102a, 102b from the database 108, either directly or through the server 106. Accordingly, based on a client-server arrangement of the system 100, with the computers 102a, 102b as the clients and the server 106 as the server, the database 108 stores the information used for analyzing tags associated with a sequence of images presented to a user to guide a user to a current interest. The server 106 performs the functionality of the algorithms described herein, including serving the information from the database 108 to the clients (e.g., computers 102a, 102b). The computers 102a, 102b present the information to the user and receive the inputs from the users, which are then presented to the server 106 for processing. However, the functionality disclosed herein with respect to the disclosed algorithms can be divided among the components of the system 100 differently than as explicitly disclosed, without departing from the present disclosure. For example, all of the functionality disclosed herein can be embodied in one or more of the computers 102a, 102b, such as the computers 102a, 102b being arranged as a distributed network, depending on the capability of the computers 102a, 102b.

As one facet of the information, the database 108 electronically stores the electronic images within a data store of images. The images can be of various file formats and image types. By way of example, the file formats can include JPEG, Tagged Image File Format (TIFF), Portable Network Graphics (PNG), etc. The image types can include digital photographs, digital drawings, icons, etc. As discussed above, the images stored on the database 108 represent a physical object that may be of interest to the user (e.g., the user may be craving). Accordingly, the images visually convey information to the user so that the user understands the physical objects that the images represent. The system 100 can initially include a set number of images. The set number of the images can be defined by the administrator of the system 100. As described below, the system 100 also allows for users to add additional images to the system 100. For example, users can upload images from the one or more computers 102a, 102b to add additional images to the database 108. As the users interact with the system 100, and the users upload images to the system 100, the number of images increases. For example, the images can be digital photographs of food (including drinks) the users who upload them have ordered or seen at restaurants they have visited.

For each image, the database 108 stores information regarding the physical object that the image represents. The physical object can be any physical (tangible) object that is representable by an image. By way of example, and without limitation, the physical objects can be food dishes, consumer goods, such as clothing, automobiles, etc., physical locations, such as vacation spots, museums, sports venues, etc. For purposes of convenience, the present disclosure is related primarily to food dishes as the physical objects. However, as understood by one of ordinary skill in the art, the disclosure is not limited to physical objects that are only food dishes. Rather, each physical object can be any physical object represented by an image such that a user can identify the physical object when presented the image.

The database 108 also stores electronic tags. Primary tags are used within the system 100 to describe and/or characterize the physical object that is represented by an image. The primary tags can include single words or several words linked together as a tag that describe or characterize the physical object overall, or that describe or characterize sub-components or sub-aspects (e.g., attributes) of the physical object. Accordingly, for each image, the image is associated with a set of tags that describe or characterize the physical object. The database 108 stores all of the tags within a pool of tags, which is the totality of tags that can be associated with an image to describe a characteristic and/or a quality of the physical object that is represented by the image. The primary tags can be any type of descriptor of the physical object represented by the image. With respect to the physical objects being food dishes, the tags can describe general aspects of the food dishes, such as, for example, an ethnicity or a cuisine of the food dish, such as African, American, Argentinian, etc., which meal of the day the food dish generally applies to, such as breakfast, brunch, lunch, dinner, supper, snack, dessert, late-night, etc. The tags can also be adjectives that describe the food dishes, such as, for example, cheesy, crunchy, hot, cold, spicy, etc. The tags can also identify the food or ingredients generally that constitute the food dish, such as, for example, vegetables, meats, fruits, breads, etc. The tags can also identify the food or ingredients more specifically that constitute the food dish, such as, for example, identifying the specific fruit, such as apples, apricots, etc., the specific meat, such as beef, poultry, fish, pork, etc., the specific vegetable, such as broccoli, asparagus, lettuce, carrots, etc. The tags can also identify the specific food dish as a whole, such as, for example, spaghetti with vodka sauce, fettuccine stroganoff, leg of lamb, etc., or constituent sub-dishes (e.g., "sides") within the food dish, such as, for example, sausage, eggs, pancakes, French toast, etc., that are all within the food dish of a large breakfast with various constituents.

The tags can be objective, subjective (or semi-subjective), or tangential regarding how the tags describe or characterize the physical object that is associated with the image. The examples of primary tags provided above are objective tags that directly describe the physical objects. The tags may additionally include tags that are at least partially subjective and/or tangentially describe the physical objects. With respect to food dishes as the physical objects for purposes of example, subjective or semi-subjective tags may include, for example, tasty, mouth-watering, delicious, healthy, hearty, etc. Such subjective or semi-subjective tags may apply to the food dish for one user but not necessarily all users. Tangential tags may describe aspects of the physical object only when correlated with other information. Such other information may only be known or apply to a subset of users that interact with the system 100. By way of example, such tags may be terms currently trending in social media, such as hashtags on TWITTER® that apply to only a subgroup of users that are following the current social media trends. Such tags include, for example, hipster, yolo, GenY, GenX, etc. Independent of the context of the tag, these tangential tags do not necessarily apply to a physical object. However, patterns may develop that allow certain tangential tags to be understood as referring to a quality or characteristic of a physical object.

Like the images, the system 100 initially begins with a certain number of tags. However, the group of tags can be dynamic and evolve as the users interact with the system 100. For example, additional tags can be added to the pool of tags as users upload new images of physical objects to the system 100 and describe the physical objects based on new tags that the users create. The users can create additional tags to describe or characterize the physical object that is associated with the image that the users uploaded. Each image is associated with one or more of the tags from among the group of tags as a set of tags for the image. The association can be based on an administrator of the system 100 associating the tags with the images. Alternatively, or in addition, the association can be based on users of the system 100 associating the tags with the images and/or creating new tags. The association based on the users can be manual, such as the users manually selecting a tag to associate with an image. Alternatively, or in addition, the association can be automatic, such as the system 100 automatically determining tags that apply to images. Based on the images being associated with multiple tags as a set of tags, the database 108 also stores information pertaining to specific sets of tags. A specific combination of tags is a set of tags. A single set of tags can describe multiple different images based on the generality of each tag and an image being associated with any number of tags. The database 108 may include a data structure, such as a table, to track the various sets of tags based on the various associations between tags and images within the database 108.

The database 108 also stores and tracks associations between elements of the system 100, such as between tags, between sets of tags, between images and tags and/or sets of tags, between users and the elements, etc. The system 100 can associate a tag with an image based on the image already being associated with another tag, and both of the tags including an association. By way of example with respect to food dishes as physical objects, an image may represent a Chinese food dish that includes rice. The image may already be associated with the tag Chinese but not be associated with the tag rice. Based on an association developed by the system 100 tracking usage of the tag "Chinese" with the tag "rice," in addition to, for example, other users liking other images that are tagged with both the tag "Chinese" and the tag "rice," the system 100 can automatically determine to associate the tag rice with the image based on the image being associated with the tag Chinese. The association can develop as the number of images that represent different physical objects increases within the database 108, or as more users interact with the tags and with the images. For example, as more users upload images to the system 100, the users may associate both of the tags Chinese and rice to the newly uploaded images. The system 100 tracks the continued association of the tag Chinese with the tag rice and logs the association within the database 108.

The tags may be divided into two overall categories, such as primary tags and secondary tags. Primary tags are defined by an administrator of the system 100. The primary tags include tags that directly describe or characterize the physical object. The system 100 at least initially includes primary tags. The system 100 can also initially include secondary tags. The secondary tags are defined by the administrator of the system 100 and/or by users of the system 100. The secondary tags may identify the same characteristic and/or quality as the primary tags, or the secondary tags may identify different characteristics and/or qualities as the primary tags. Secondary tags may directly describe or characterize the physical object, such as with primary tags. In addition, secondary tags may subjectively describe or characterize the physical objects, or may tangentially describe or characterize the physical objects as described above.

Each image is associated with at least one primary tag, but can be associated with any number of primary tags and secondary tags. Some images may be associated with only one primary tag. For example, an image may represent the physical object bread and the only tag associated with the image may be the tag bread. Some images may be associated with many different tags, such as an image that represents the physical object of French toast, which can include the tags bread, breakfast, egg, sweet, etc.

The systems and methods of analyzing tags associated with a sequence of images presented to a user to guide a user to a current interest relies on a plurality of tags that is associated with a user being processed based on a previous set of tags of an image and a preference for that image from the user. Accordingly, the database 108 may store, or the server 106 may dynamically generate, a plurality of tags that are a subset of all of the tags (e.g., pool of tags) that are stored on the database 108. The plurality of tags includes not only the tags but also the sets of tags that correspond to the images that are covered by one or more of the tags. As will be described in greater detail below, the plurality of tags may be tags that apply or are relevant to a user, such as tags within the pool of tags that match tags associated with a user's profile. As the user is presented with images and provides preferences in response to the images, the plurality of tags evolves as certain tags are removed (or not considered) and/or certain sets of tags are removed (or not considered) from the plurality of tags.

The database 108 also stores user profiles. Generally, the user profiles include information that is used for the interacting with the system 100. Such information can include certain tags indicated by the user to include with the user's profile, images, physical objects, and/or entities for which the user has indicated a positive or a negative preference, independent of or dependent of the user interacting with images presented to the user during a session of analyzing tags associated with a sequence of images presented to a user to guide a user to a current interest. With respect to food dishes for the physical objects, the information can include tags and images that apply to food dishes that the user prefers (e.g., likes), and food dishes that the user does not prefer (e.g., dislikes). The user can indicate such preferences through a manual selection of the tags. Alternatively, or in addition, such preferences can be learned by the system 100 during the user's interaction with the system 100 over a period of time, such as through an implicit selection of the tags as preferred tags through the user indicating over time a preference for the tags. The preference can be indicated according to a YES/NO schema, such as the user does or does not like a tag, an image, and/or a physical object. Alternatively, the preference can be indicated according to a weighted schema, such as a degree to which the user does or does not like a tag, image, and/or physical object. The profile information can include any other additional information associated with a user, such as the user's name, address, gender, age, ethnicity, religion, etc. The system 100 tracks such additional information to mine trends across the users for tags, images, and/or physical objects. For example, the system 100 tracks user's interactions within the system 100 to develop a user history. The user history tracks interactions between the user and the system 100 and allows the user to review the previous interactions. By way of example, the user history can include information pertaining to the user's preference to specific images that were previously presented to the user.

According to some embodiments, and with respect to food dishes as the physical objects specifically, the user profiles can include dietary restrictions, such as, for example, gluten-free, vegan, vegetarian, religious observations (e.g., no pork or shellfish, or Kosher/Halal only), nut allergies, etc. The database 108 can include dietary information to automatically translate the entered dietary restrictions into negative preferences for certain tags, images, and/or physical objects to which the dietary restrictions apply so that restricted food dishes are not presented to the user. The dietary information can be linked to the user's profile so that the user can view the dietary information used by the system 100.

As discussed above, the physical objects represent objects that are offered by various entities. The database 108 includes information with respect to the location of the entity associated with the physical object and/or the image that represents the physical object. By way of example, the physical object can represent a food dish and the physical entity represents the restaurant or store (e.g., market, grocery store, etc.) that offers the food dish. The database 108 includes information with respect to the location of the restaurant or store. In addition to the location, the database 108 can also include entity profiles. According to some embodiments, the entity profiles can be organized according to a subscription-based system. Entities that are subscribed to the system 100 can include specific information within their profiles that entities who are not subscribed cannot. With respect to food dishes, such information can include food dishes offered by the entity, such as images of food dishes that the entities created and uploaded into the system 100, in addition to the menu, any current specials/promotions/discounts offered, etc. According to some embodiments, user interactions with the system 100 will allow for the users to confirm the information presented in the entity profiles. The entity profiles can also include images to showcase the entity's physical objects, additional links leading to their websites or social media applications (e.g., FACEBOOK®, TWITTER®), etc.

The entity profiles allow users to browse the entities and click on a suggested or profiled entity, leading the user to the entity's profile. As part of the above-described associations, the system 100 collects and shares visitor frequency with entities when users are redirected to the entities' websites following selection of images associated with physical objects that are associated with the entities. According to some embodiments, the entity profiles will include a direct purchasing interface for users, thereby obviating the need for users to seek third party companies to order or consume physical objects associated with the entity.

Figure 2A:
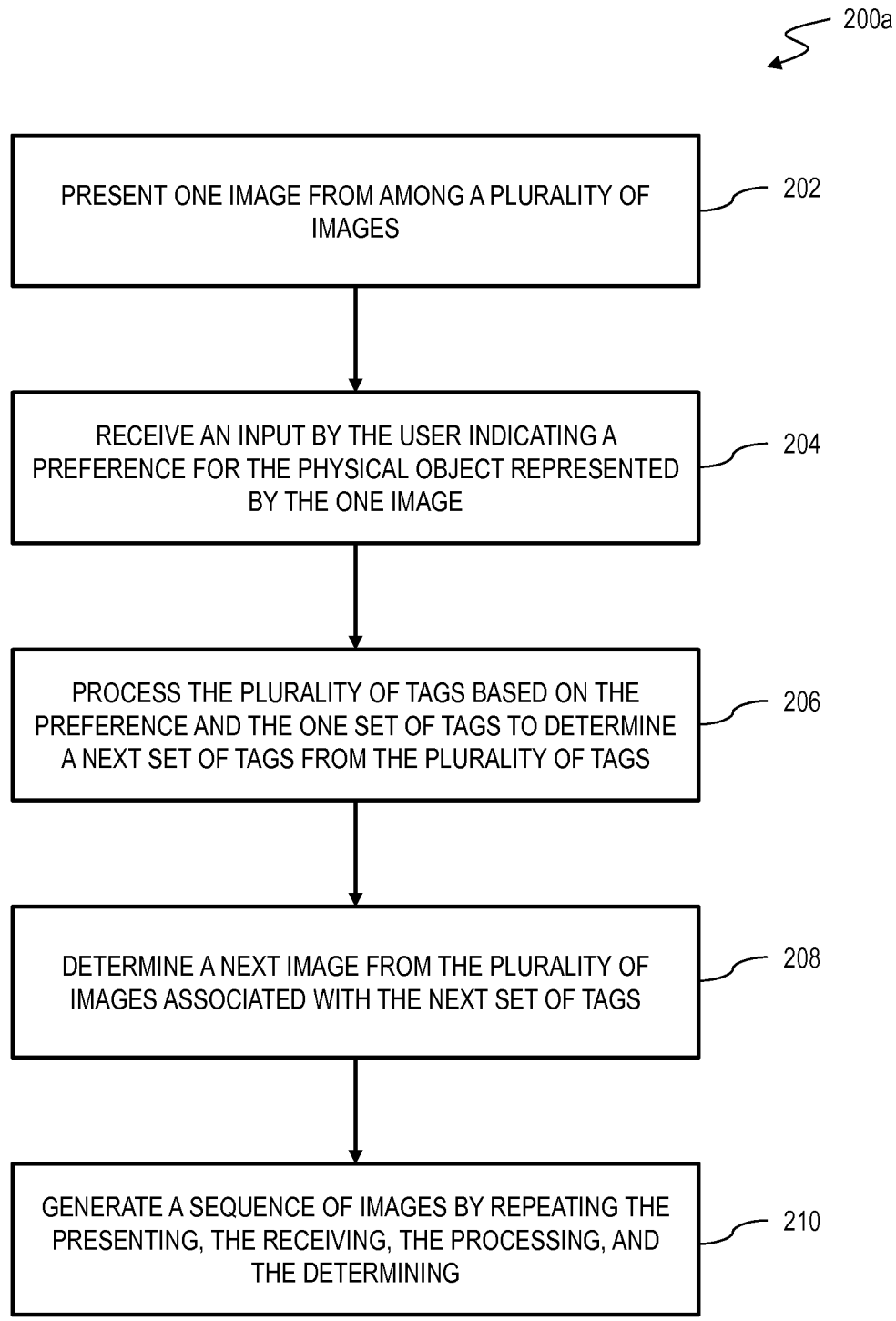
FIG. 2A is a flowchart of a computer-implemented method or algorithm of analyzing tags associated with a sequence of images presented to a user to present a current interest of the user according to aspects of the present disclosure.

FIG. 2A is a flowchart of a computer-implemented method or algorithm 200a of analyzing tags associated with a sequence of images presented to a user to guide a user to a current interest, using aspects of the present disclosure including the one or more computers 102a, 102b, the server 106, and the database 108. The computer-implemented method or algorithm 200a may be executed within a computer 102a, the server 106, the database 108, or across multiple platforms, such as on the computer 102a and the server 106. In regard of the latter arrangement, an application 114a executed by the computer 102a (e.g., client-side application) may perform the computer-implemented method or algorithm 200a in conjunction with an application executed on the server 106 (e.g., server-side application) according to a client-server relationship. The computer-implemented method or algorithm 200a begins with a user initiating a session of the computer-implemented method or algorithm 200a. As will be described in greater detail below, the session of the computer-implemented method or algorithm 200a begins with determining a plurality of tags that are associated with the user and that will be processed to determine subsequent images to present to the user to generate a sequence of images during a session of the computer-implemented method or algorithm 200a. The plurality of tags also determines the plurality of images from which the images that are presented to the user are selected from. Thus, according to some embodiments, the computer-implemented method or algorithm 200a processes only a subset of the tags and the images stored in the database 108 based on the user that initiated the session of the computer-implemented method or algorithm 200a. The computer-implemented method or algorithm 200a begins with one of the images from among the plurality of images being presented to the user, such as through the display device 112a of the computer 102a (202). As described above, the image represents a physical object and is associated with a set of tags. Each of tag of the set of tag describes the physical object that is represented by the presented image. Thus, the user is presented with an image, and the user is able to recognize the physical object represented by the image.

As will be also described below, along with the image, one or more user interface elements or objects can be optionally presented on the display device 112a of the computer 102a to allow the user to indicate a preference or inclination/disinclination for the physical object that is represented by the image. The user interface elements may vary depending on the functionality/capability of the computer device 102a, the user interface device 110a, and/or the display device 112a. Alternatively, the display device 112a may not present graphical user interface elements (although it could) specifically for the user indicating the preference for the physical object. Rather or additionally, for example, it may be implicit what action the user should take to indicate the preference, such as by swiping left on or near the image or anywhere on the display device 112a to indicate a negative preference (e.g., dislike) and swiping right on or near the image or anywhere on the display device 112a to indicate a positive preference (e.g., like), or vice versa. To be clear, the present disclosure also contemplates displaying graphical UI elements (e.g., like and dislike virtual buttons displayed on the display device 112 for selection using a user interface device 110), and recognizing gestures (e.g., swiping) made by a user relative to a user interface device 110, or one or the other.

Upon the image being presented (e.g., displayed on the display device 112) to the user, the computer-implemented method or algorithm 200a receives an input from the user indicating a preference for the physical object represented by the image (204). The preference may be like or an inclination toward the object (e.g., positive) or dislike or disinclination against the object (e.g., negative). Alternatively, the preference may be like (e.g., positive), dislike (e.g., negative), or neither like nor dislike (e.g., neutral). A neutral preference may indicate that the user cannot tell whether he or she likes or dislikes the physical object represented by the image. Alternatively, the preference may be scaled, such as a range of 1 to 10 to indicate the degree that the user likes (e.g., 6 to 10) or dislikes (e.g., 1 to 5) the physical object represented by the image.

The computer-implemented method or algorithm 200a then processes the plurality of tags based on the preference indicated by the user (206). Processing of tags refers to the manipulation or treatment of the tags drawn from the pool of tags by the computer 102 or server 106 during a session. The plurality of tags that is processed is the tags that are selected from the pool of tags stored within the database 108. The processing includes determining a next set of tags based on the preference the user provided in response to the previous image, and the set of tags that are associated with the previous image. Based on the preference, the set of tags from the previous image determine how the plurality of tags is processed to determine the next set of tags. By way of example, if the preference that the user indicated to a previous image is positive, negative, or neutral, the plurality of tags are processed (e.g., treated) differently based on the set of tags of the previous image. In response to the preference for the physical object represented by the previous image being negative, the processing of the plurality of tags includes removing tags from the plurality of tags that correspond to the tags from the set of tags of the previous image. The tags are removed from the plurality of tags that are processed to determine the next set of tags at each iteration of the computer-implemented method or algorithm 200a, for the remainder of the session, so that an image is not presented to the user for the remainder of the session that includes the particular tags. Although the tags are described throughout as being removed from the plurality of tags, removal includes removing the tags from the plurality of tags and also includes leaving the tags within the plurality of tags but not considering the tags. For example, the tags can remain within the plurality of tags but the tags can be marked as, for example, removed such that the tags are not considered during the processing of the plurality of tags.

As discussed above, the tags can be categorized generally as primary tags and secondary tags. An image can be associated with both primary tags and secondary tags. According to some embodiments, the tags that are associated with an image and that are removed from the plurality of tags in response to a negative preference are only the primary tags from the set of tags associated with the image that received a negative preference. Alternatively, both the primary tags and the secondary tags from the set of tags associated with an image that received a negative preference are removed from the plurality of tags in response to a negative preference. Alternatively, whether only primary tags or both primary tags and secondary tags are removed from the plurality of tags may be determined based on the number that have been presented to the user. For example, if the image is one of the first N images presented to the user, where N is 3, 4, or 5, only the primary tags associated with the image are removed from the plurality of tags in response to an input by the user indicating a negative preference. However, if the image is a later image presented to the user, such as the sixth, seventh, or eighth image, both the primary tags and the secondary tags that are associated with the image are removed from the plurality of tags. For subsequent images that are presented to a user after the user has indicated a positive preference to at least one previous image, only those tags that are associated with the newly presented image and that are new relative to the previously presented set of tags are the tags that are removed from the plurality of tags, whether they are only primary tags or both primary and secondary tags.

In addition to removing tags (e.g., negative tags) that are associated with an image that the user provides a negative preference for, the computer-implemented method or algorithm 200a may also remove tags that are associated with the negative tags from the plurality of tags (e.g., associated tags). As discussed above, in addition to the tags being stored in the database 108, the database also stores associations between tags. For example, certain tags may be associated with other tags based on trends in the physical objects represented by the images, such as the tag labeled "Chinese" being more associated with the tag labeled "rice" than the tag labeled "burger." Accordingly, in response to a negative preference, the computer-implemented method or algorithm 200a may determine associated tags that satisfy a threshold association with the negative tags. The threshold for the association may be based on any number of factors or metrics, such as the number of times two tags are associated with the same image, the number of times a user indicates a certain preference (e.g., like or dislike) for an image, and the tags that are associated with the image, etc. For example, the association may be based on the number of times two tags are associated with an image when the image is indicated by a user as having a positive preference. However, the threshold for determining the association may vary without departing from the spirit and scope of the present disclosure.

In response to the preference for the physical object represented by the image being positive or favorable, the processing of the plurality of tags includes determining additional tags to add to the tags from the set of tags associated with the image. The additional tags further narrow down the current interest of the user by building upon the tags associated with the previous image, for which the user provided a positive preference.

To determine the one or more additional tags, the computer-implemented method or algorithm 200a processes the plurality of tags to determine the tags that have an association with the positive tags. By way of example, if the tags associated with the previous image include the tags meat and lunch, the computer-implemented method or algorithm 200a processes the plurality of tags to determine tags that are associated with meat and bun, such as the tags hamburger or hot dog rather than, for example, the tag cereal. Similar to above, the threshold for the association may be based on any number of factors or metrics, such as the number of times two tags are associated with the same image, the number of times a user indicates a certain preference (like or dislike) for an image, and the tags that are associated with the image, etc. However, the threshold for determining the association may vary without departing from the spirit and scope of the present disclosure.

Upon determining tags that satisfy a threshold association with one or more tags from the set of tags that are associated with an image that the user indicated a positive preference for, the computer-implemented method or algorithm 200a determines a next set of tags based on the next set of tags including at least one tag of the tags having the threshold association. Thus, if several tags are determined as having a threshold association with one or more tags that are associated with an image that the user indicated a positive preference for, one or more of those tags are selected and the next set of tags includes the one or more tags of those tags and the previous tags of the previous image. If more than one tag exists that satisfies the threshold association with a tag from the previous set of tags, the selection of which of the one or more tags to add to generate the next set of tags can vary. The selection can be random, such that, for example, one or more tags from a total of four tags are selected to be included in the next set of tags. Alternatively, the selection can be based on a weighting of the tags. The weighting can be determined based on one or more factors and/or metrics. According to one metric, the weighting can be based on which tag has the highest association with one tag, more than one tag, or all of the tags of the set of tags associated with the previous image that the user indicated a positive preference for. The association can be relative to all tags within the group or pool of tags, all tags that are relevant to the particular user (e.g., that the user indicated a preference for), or all tags within the same category of tags, such as meal, type of food, etc. However, the weighting can be based on any type of metric or schema, such as based on a profile of the user, physical objects associated with the tags having a threshold association, locations corresponding to the physical objects associated with the tags having a threshold association, entities corresponding to the physical objects associated with the tags having a threshold association, or a combination thereof. Once the weighting of the tags is determined, the one or more tags that are added to the set of tags associated with the previous image are selected such that the selected tags are the tags with the highest weighting.

As discussed above, the tags can be categorized generally as primary tags and secondary tags. An image can be associated with both primary tags and secondary tags. According to some embodiments, only tags within the plurality of tags that are primary tags are processed to determine additional primary tag(s) to add to the previous set of tags. Alternatively, all tags within the plurality of tags (e.g., primary and secondary) are processed to determine the additional tags to be added to the previous set of tags. Whether only primary tags are both primary tags and secondary tags are processed to determine additional tags to add to the set of tags associated with the previous image can be determined based on the number of images within a sequence that already have been presented to a user. For example, if the image is one of the first N images presented to the user, where N is 2, 3, 4, or 5, only the primary tags within the plurality of tags are processed to determine an additional tag to add to the previous set of tags. However, if the image is a later image presented to the user, such as the sixth, seventh, or eighth image within a session, both primary tags and secondary tags are processed to determine additional tags to add to the previous set of tags.

As discussed above, the preference that a user can indicate in response to being presented an image representing an object can be a positive preference or a negative preference. Additionally, the preference can be a neutral preference. In response to the preference indicated for an image being a neutral preference, the set of tags (e.g., combination of tags) that are associated with the image are logged and no set of tags (e.g., combination of tags) that include only that set of tags is subsequently presented to the user for the remainder of the session. Therefore, no image that is associated with a set of tags that includes only that set is presented to the user for the remainder of the session. Alternatively, in response to the preference being a neutral preference, the set of tags that are associated with the image are logged and no set of tags that include that set of tags, in addition to any other tags, is subsequently presented to the user for the remainder of the session. Accordingly, in response to a neutral preference, the computer-implemented method or algorithm 200a processes the plurality of tags and determines the next set of tags based on the next set of tags not including the one set of tags corresponding to the image, either alone or, alternatively, in any combination with additional tags, for a remainder of the session. Thus, sets of tags are logged that are associated with a neutral preference to narrow the possible next sets of tags and, therefore, images, that can be presented to the user.

In addition, according to some embodiments, and similar to the discussion above with respect to a negative preference, the sets of tags that can be excluded from the possible next set of tags can include sets of tags that include tags that satisfy a threshold association with one or more tags within the set of tags associated with a neutral preference.

Upon determining the set of tags based on the preference and the set of tags for the previous image, the computer-implemented method or algorithm 200*a* determines the next image to present to the user (208). The next image is an image from a plurality of images that is associated with the next set of tags. Multiple images can be associated with the same set of tags. Accordingly, the computer-implemented method or algorithm 200*a* the selects a single image from the images that share the same set of tags. The criteria of the selection of the image can vary. The selection can be random, such that a random image is selected from the images that share the same set of tags. Alternatively, the selection may be based on a process or metric. As discussed above, the database 108 stores information pertaining to how many times the user has interacted with a specific tag and/or a specific image. The process or metric can include analyzing the number of interactions between the user and the images that share the same set of tags and selecting the image that has the highest number of interactions. The image with the highest number of interactions may offer a high likelihood that the user has a current interest in the physical object represented by the image. Alternatively, the process can include selecting the image that has the lowest number of interactions with the user. The interactions can include any interaction, such as any time the user was presented the image and regardless of the preference the user provided in response to the image. Alternatively, the interactions can be limited to only interactions where the user provided a specific preference, such as a positive preference, a negative preference, or a neutral preference. Alternatively, the process or metric may be based on the entity that is associated with the physical object that is represented by the image. Images that are associated with entities that have subscribed to the system 100 may be weighted higher than images that are associated with entities that have not subscribed to the system 100. Thus, an image may be presented to a user, among multiple images that are associated with the same set of tags, if the image is associated with a subscribing entity.

The computer-implemented method or algorithm 200*a* generates a sequence of images based on repeating the above process of at least presenting the image to the user and awaiting an input from the user regarding whether the user has a positive or negative, or neutral, preference for the physical object represented by the next image (210). The session of the computer-implemented method or algorithm 200*a* continues each time the user provides a preference for the currently presented image, and determines the next set of tags and the next image to present based on the preference for the previous image and the set of tags associated with the previous image. The user providing the preferences narrows down the physical object that the user is currently interested in based on the set of tags associated with the images presented to the user that represent the various possible physical objects. The computer-implemented method or algorithm 200*a* continues within a session as long as the user continues to provide inputs corresponding to the user's preferences to physical objects represented by images. Thus, according to some embodiments, the computer-implemented method or algorithm 200*a* continues indefinitely or at least until the number of images and/or tags are exhausted during the session based on the processing discussed above. During the session, tags and sets of tags are removed based on negative or neutral responses, as described above. Thus, a session can end in the event that there are no more tags and/or images to present to a user. Alternatively, a single session of presenting a sequence of images can last until a predetermined number of images have been presented or displayed to the user or until a predetermined number of inputs have been received from the user. For example, a session of presenting images can last for 10 images. If the user has not yet determined a physical object that the user is currently interested in after the $10^{th}$ image, the session ends, and the computer-implemented method or algorithm 200*a* restarts a new session. Restarting a new session of the computer-implemented method or algorithm 200*a* resets the removed tags, the sets of tags that were neutralized, or both from the previous session. For example, all of the plurality of tags and sets of tags that were initially available at the beginning of the computer-implemented method or algorithm 200*a* are again available from which to determine new sets of tags and new images to present to the user. Alternatively, the session of the computer-implemented method or algorithm 200*a* ends once the user selects an image that represents a physical object that the user is interested in, as described in more detail below.

Figure 2B:
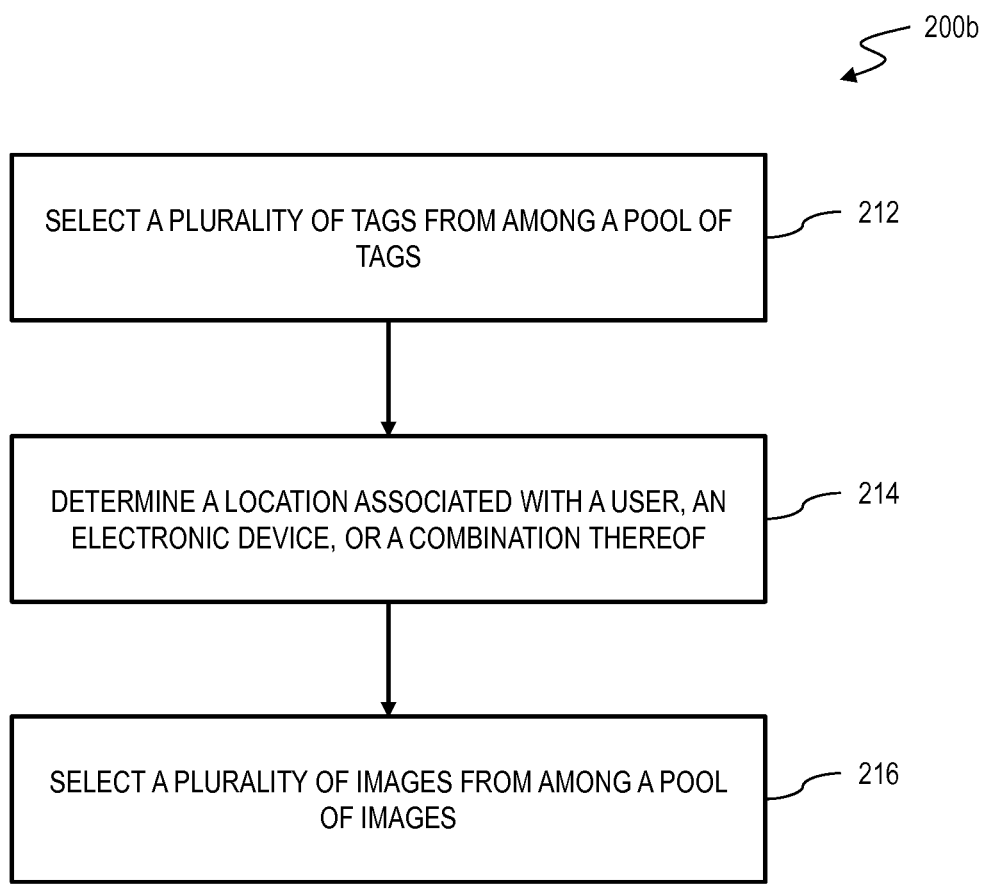
FIG. 2B is a flowchart of a computer-implemented method or algorithm of determining from among a pool of tags and a pool images tags and images that are relevant for a user according to aspects of the present disclosure.

FIG. 2B is a flowchart of a computer-implemented method or algorithm 200*b* of determining, from among the entire pool of tags and the entire pool images, the plurality of tags and the plurality of images that are relevant for the user for a particular session and that are processed and analyzed for determining images to present to the user, using aspects of the present disclosure including the computer 102*a*, the server 106, and the database 108. The computer-implemented method or algorithm 200*b* can be a separate algorithm for purpose of implementation within the system 100 than the computer-implemented method or algorithm 200*a*. Alternatively, the computer-implemented method or algorithm 200*b* can be an extension or sub-routine of the computer-implemented method or algorithm 200*a*.

The computer-implemented method or algorithm 200*b* selects the plurality of tags that are processed for determining the next set of tags, discussed above in the computer-implemented method or algorithm 200*a*, and from which an initial image is presented, from among the pool of tags within the database 108 (212). The plurality of tags is selected based on the plurality of tags matching one or more tags associated with a profile of the user. Thus, tags that are relevant to a user, according to the tags matching tags that are within the user's profile, are selected to be within the plurality of tags that are processed as discussed above in the computer-implemented method or algorithm 200*a*. The tags that are selected are tags that have an exact match with tags within a user's profile. Alternatively, the tags that are selected are tags that have an exact match or that satisfy a threshold association with tags within the user's profile. The association can be based on any association described herein, such as the tags typically being associated with the same image based on trends of images and tags within the database 108. The tags that are selected from among the pool of tags can be only primary tags, or the tags can be both primary tags and secondary tags. In some examples, primary and secondary tags have an equal weight, but in other examples, a primary tag can have a higher weight compared to a secondary tag.

The computer-implemented method or algorithm 200*b* also determines a location associated with the user, the computer 102*a* that is executing the application to perform the computer-implemented method or algorithm 200*b*, or a combination thereof (214). The location associated with the computer 102*a* can be determined automatically based on various functionality of the computer 102*a*, such as a GPS (global positioning system) receiver within the computer 102*a*. Alternatively, the location associated with the user and the computer 102*a* can be determined based on the user manually entering a location within the computer 102*a*. The location manually entered by the user can be a current location or a different location, such as a location that a user plans on being at during a certain time.

Based on the plurality of tags that are selected from the pool of tags, and the location of the user and/or the computer 102*a*, the computer-implemented method or algorithm 200*b* selects images from among the pool of images (216). The images are selected based on the images being associated with at least one tag of the plurality of tags that are selected from the pool of tags. Further, the images are selected based on each image being associated with the location of the user and/or the computer 102*a*. The images are selected based on the location because, as discussed above, the location corresponds to the location of availability of the physical object that is represented by the image. Based on the computer-implemented method or algorithm 200*b*, the processing of the tags and the selection of the images within the computer-implemented method or algorithm 200*a* is limited to the tags that are relevant to the user and to the images that represent physical objects that are local to a specific location (e.g., current geographic location of user and/or computer 102*a*, or planned/expected location of the user and/or computer 102*a*).

The first image presented during a session of the computer-implemented method or algorithm 200*a* is an image within the pool of images. By way of example, the first image is randomly selected from among the plurality of images as a first image of the sequence of images. Alternatively, the first image can be an image from among the plurality of images that is associated with a high number of interactions with the user, either through direct interactions between the user and the image, such as the user indicating a preference in response to being presented an image, or through interactions between one or more tags associated with the image and the user. Alternatively, the first image presented to the user within a session of the computer-implemented method or algorithm 200*a* can be based on a search of the user for a specific tag, physical object, or entity that provides the physical object. For example with respect to food, the user can elect to begin a session of the computer-implemented method or algorithm 200*a* and enter the name of the physical object they seek, such as Chinese chicken salad. In response, the computer-implemented method or algorithm 200*a* searches for images within the database 108 containing one or more tags describing or characterizing Chinese chicken salad, enabling the user to search their geographic area for restaurants/vendors bearing that food item. At the same time, this functionality encourages restaurants (e.g., entities) associated with premium accounts to upload images of their food dishes, thereby making their food dishes searchable within the system 100 for all potential users within their local area.

Figure 2C:
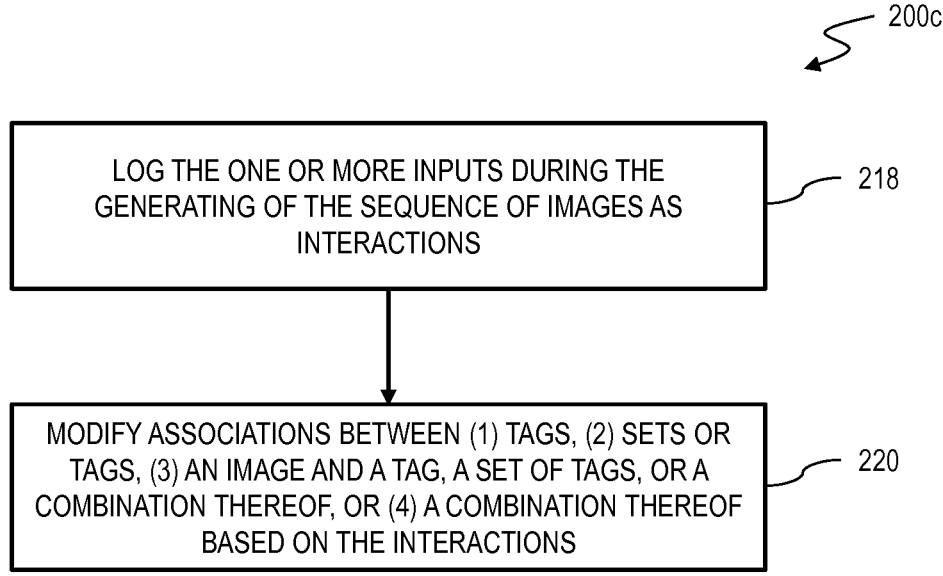
FIG. 2C is a flowchart of a computer-implemented method or algorithm of determining and/or updating associations between elements within the system according to aspects of the present disclosure.

FIG. 2C is a flowchart of a computer-implemented method or algorithm 200*c* of determining and/or updating associations between elements within the system 100, using aspects of the present disclosure including the computer 102*a*, the server 106, and the database 108. The computer-implemented method or algorithm 200*c* can be a separate algorithm for purpose of implementation within the system 100 than the computer-implemented method or algorithm 200*a* and 200*b*. Alternatively, the computer-implemented method or algorithm 200*c* can be an extension or a subroutine of the computer-implemented method or algorithm 200*a*. During a session of generating a sequence of images by the computer-implemented method or algorithm 200*a*, the computer-implemented method or algorithm 200*c* logs the inputs from the user as interactions (218). The inputs are logged as interactions with the tags, the sets of tags, the images, the physical objects, and/or the entities associated with the physical objects for which the inputs apply. When a user provides an input of a preference associated with an image, the input is logged as applying to the image, the physical object represented by the image, one or more tags associated with the image, and/or the entity associated with the physical object. The input can be logged relative to only the user, or the input can be logged across all users.

The logging of the inputs allows the computer-implemented method or algorithm 200*c* to modify associations between the various informational elements within the system 100 (220). For example, the logging allows the computer-implemented method or algorithm 200*c* to modify associations tags, between sets of tags, and/or between an image and a tag and/or a set of tags based on the interactions. The associations can be modified relative to the user making the inputs, or the associations can be applied to all users. Accordingly, the associations discussed and used with the computer-implemented method or algorithms 200*a* and 200*b* are dynamic and constantly evolving based on the continued user inputs.

Figure 3:
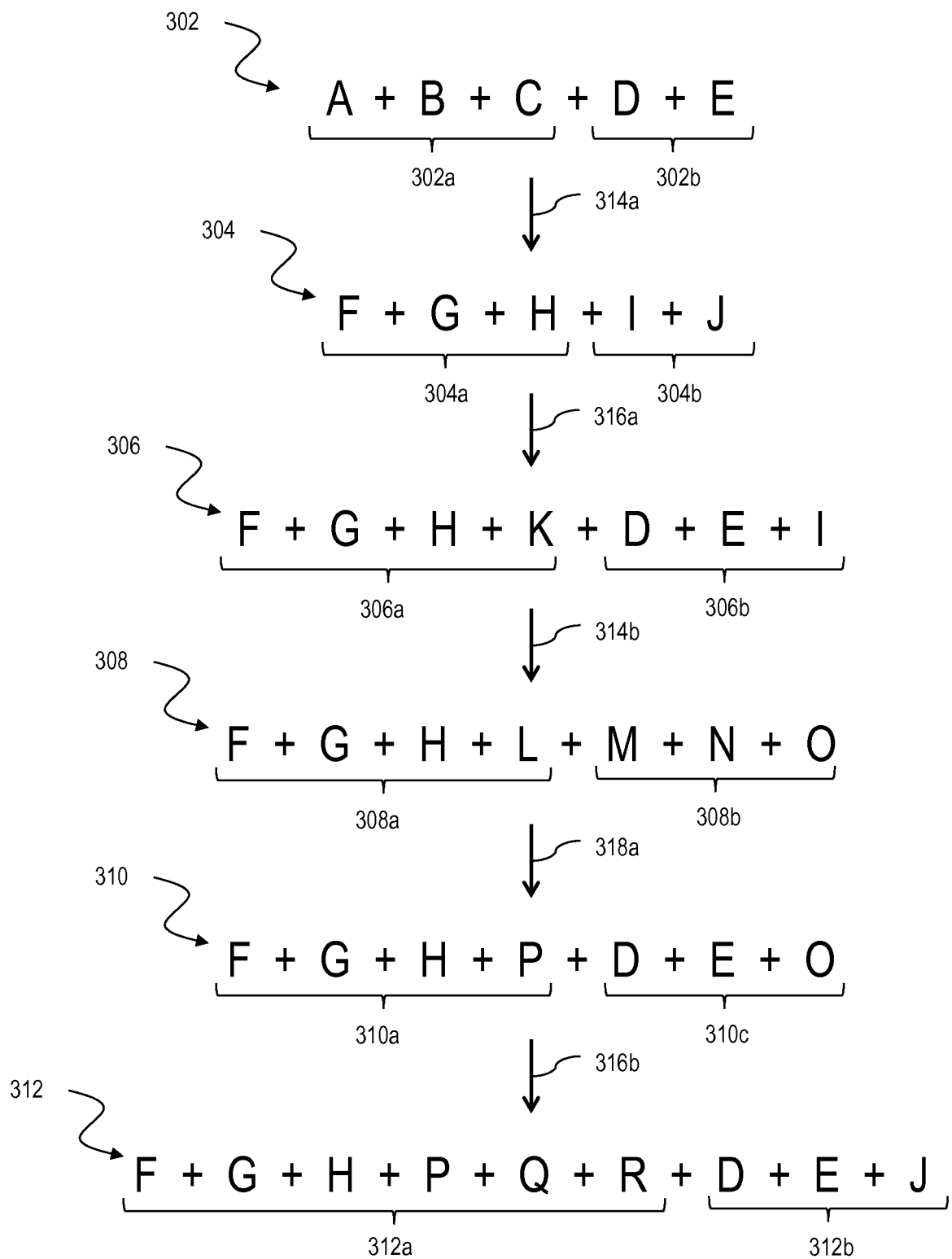
FIG. 3 is a diagram of a flow illustrating the processing of a plurality of tags that are relevant to a user according to aspects of the present disclosure.

FIG. 3 is a diagram of a flow 300 illustrating the processing of a plurality of tags that are relevant to a user over the course of a session of the computer-implemented method or algorithm 200*a*. The flow begins with a set of tags 302. The set of tags 302 is associated with an image that is presented to the user at the computer 102*a* through execution of the application 114*a*. Specifically, the display device 112*a* displays the image that is associated with the set of tags 302. As shown, the set of tags 302 includes primary tags 302*a* and secondary tags 302*b*. The tags can be any of the above-described tags; however, for purposes of convenience, the tags are represented by alphabetical characters. Thus, the primary tags 302*a* of the tag 302 include the tags A, B, and C, and the secondary tags 302*b* of the tag 302 include the tags D and E.

In response to the presentation of the image associated with the set of tags 302, the user indicates, for example, a preference for the physical object represented by the image. As described above, the preference may be indicated through the user interface device 110*a*. For purposes of explanation, the preference is represented by the arrow 314*a* in FIG. 3. Specifically, the arrow 314*a* represents a preference for the image associated with the set of tags 302 that is negative.

Based on the negative preference, the computer-implemented method or algorithm 200*a* processes the plurality of tags to determine a next set of tags and a next image that is associated with the next set of tags. The set of tags 304 represents the next set of tags determined by the computer-implemented method or algorithm 200*a*, and an image that is associated with the set of tags 304. The set of tags 304 includes the primary tags 304a F, G, and H, and the secondary tags 304b I and J. Because the user provided a negative preference in response to the physical object represented by the image that was associated with the set of tags 302, the set of tags 304 does not include any of the primary tags 302a. Specifically, the primary tags 302a of A, B, and C were removed from the plurality of tags that are processed to determine the next set of tags for the remainder of the session of the computer-implemented method or algorithm 200a.

Similar to above, in response to the presentation of the image associated with the set of tags 304, the user indicates a preference for the physical object represented by the image. For purposes of explanation, the preference is represented by the arrow 316a in FIG. 3. Specifically, the arrow 316a represents a preference for the image associated with the set of tags 304 that is positive.

Based on the positive preference, the computer-implemented method or algorithm 200a processes the plurality of tags to determine a next set of tags and a next image that is associated with the next set of tags. The set of tags 306 represents the next set of tags determined by the computer-implemented method or algorithm 200a, and an image that is associated with the set of tags 306. Because the user indicated a positive preference to the previous physical object represented by the image associated with the set of tags 304, the set of tags 306 includes the primary tags 306a F, G, H, and K, which are the primary tags 304a and the additional primary tag K. That is, the computer-implemented method or algorithm 200a builds upon the set of tags 304 based on the positive preference of the user by determining a set of tags that includes the previous primary tags and an additional primary tag (or more), and the corresponding image that the set of tags is associated with.

The set of tags 306 also includes the secondary tags 306b D, E, and I. Despite the user indicating a negative preference for the set of tags 302, which included the secondary tag D, the secondary tag D can be used again in a subsequent set of tags because the tag is a secondary tag. Alternatively, the secondary tags may also be removed from the plurality of tags that are processed, for the remainder of the session, to determine a next set of tags, instead of only the primary tags.

In response to the presentation of the image associated with the set of tags 306, the user indicates a preference for the physical object represented by the image. For ease of explanation, the preference is represented by the arrow 314b in FIG. 3. Specifically, the arrow 314b represents a preference for the image associated with the set of tags 306 that is negative.

Based on the negative preference, the computer-implemented method or algorithm 200a processes the plurality of tags to determine a next set of tags and a next image that is associated with the next set of tags. The set of tags 308 represents the next set of tags determined by the computer-implemented method or algorithm 200a, and an image that is associated with the set of tags 308. The set of tags 308 includes the primary tags 308a F, G, H, and L, and the secondary tags 304b M, N, and O. Because the user provided a negative preference in response to the physical object represented by the image that was associated with the set of tags 306, the set of tags 308 does not include the primary tag that was added between the set of tags 304 (e.g., last positive preference) and the set of tags 306, i.e., primary tag K. That is, the negative preference in response to the set of tags 306 is attributed to the addition of the primary tag K; thus, the primary tag K is removed from the plurality of tags for the remainder of the session such that no subsequent set of tags can include the primary tag K. The set of tags 308 also includes the secondary tags 308b M, N, and O.

In response to the presentation of the image associated with the set of tags 308, the user indicates a preference for the physical object represented by the image. For purposes of explanation, the preference is represented by the arrow 318a in FIG. 3. Specifically, the arrow 318a represents a preference for the image associated with the set of tags 308 that is neutral.

Based on the neutral preference, the computer-implemented method or algorithm 200a processes the plurality of tags to determine a next set of tags and a next image that is associated with the next set of tags. The set of tags 310 represents the next set of tags determined by the computer-implemented method or algorithm 200a, and an image that is associated with the next set of tags 310. The set of tags 310 includes the primary tags 310a F, G, H, and P, and the secondary tags 310b D, E, and O. Because the user provided a neutral preference in response to the physical object represented by the image that was associated with the set of tags 308, the set of tags 310 does not include the primary tag that was added between the set of tags 306 (e.g., last positive preference) and the set of tags 308, i.e., primary tag L. That is, the neutral preference in response to the set of tags 308 is attributed to the entire set of primary tags 308a, including the primary tag K and the primary tags F, G, and H. Thus, the set of primary tags 308a is removed from the plurality of tags that are processed, in the sense that the exact same set of primary tags 308a can never be presented to the user again. However, the primary tag L is not removed from the plurality of tags for the remainder of the session such that subsequent sets of tags can include the primary tag L, as long as the set of tags is not the exact set of primary tag 308a. The set of tags 310 also includes the secondary tags 310b D, E, and O.

In response to the presentation of the image associated with the set of tags 310, the user indicates a preference for the physical object represented by the image. For purposes of explanation, the preference is represented by the arrow 316b in FIG. 3. Specifically, the arrow 314b represents a preference for the image associated with the set of tags 310 that is positive.

Based on the positive preference, the computer-implemented method or algorithm 200a processes the plurality of tags to determine a next set of tags and a next image that is associated with the next set of tags. The set of tags 312 represents the next set of tags determined by the computer-implemented method or algorithm 200a, and an image that is associated with the set of tags 312. Because the user indicated a positive preference to the previous physical object represented by the image associated with the set of tags 310, the set of tags 312 includes the primary tags 310a F, G, H, P, Q, and R, which are the primary tags 310a and the additional primary tags Q and R. That is, as described above, the computer-implemented method or algorithm 200a builds upon the positive preference of the user by determining a set of tags that includes the previous primary tags and one or more additional primary tags, and the corresponding image that the set of tag is associated with.

The flow 300 continues until the user selects a physical object that is represented by a currently presented image, which corresponds to the last image that is presented within the above sequence of images, is a physical object that the user would like to obtain. Alternatively, the flow 300 continues until the session is ended and restarted, for the reasons discussed above. In each case, when a session of the computer-implemented method or algorithm 200a is started or restarted, the plurality of tags and images that are processed are reset such that the tags and sets of tags that were removed from the plurality of tags are inserted back into the plurality of tags for processing.

The following figures use any of the aspects described above in connection with the foregoing FIGS. 1-3. These figures and accompanying description lay out some of the foundational aspects of the present disclosure, which the following figures show as mere exemplars of the many implementations contemplated by the present disclosure.

Figure 4F:
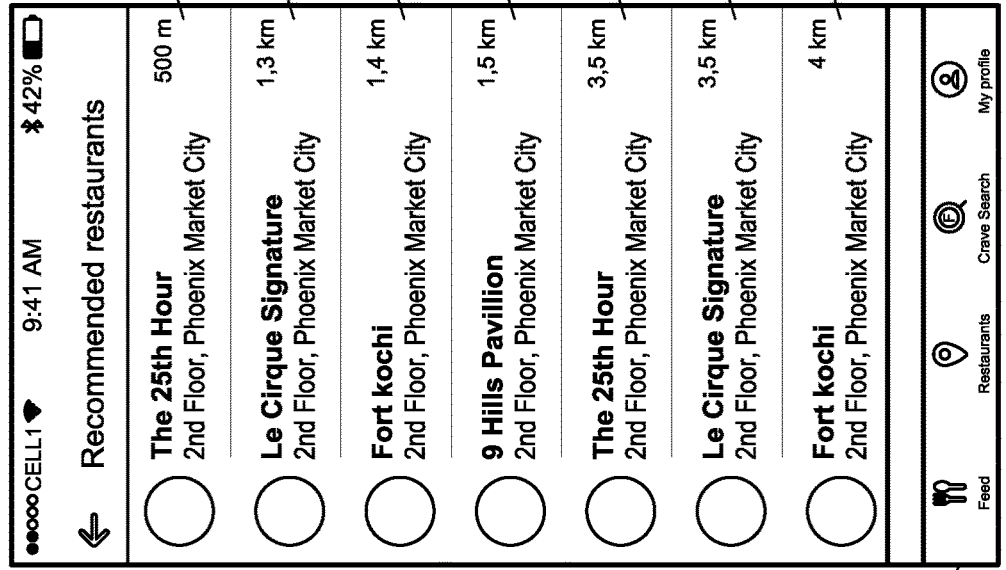
FIG. 4F illustrates another user interface of a computer-implemented method or process of analyzing tags associated with a sequence of images presented to a user to present a current interest of the user according to aspects of the present disclosure.

FIGS. 4A-4G illustrate user interfaces (UIs) 400a-400g, respectively, that are presented on a computer device 102a as part of an application 114a executed on the computer device 102a for analyzing tags associated with a sequence of images presented to a user to guide a user to a current interest. Referring to FIG. 4A, when starting a session of the computer-implemented method or algorithm, images appear one at a time and users interact with the images to populate a dynamic sequence of images. According to the various configurations of the system 100, the images are pushed by the server 106, from the database 108, to the application 114a on the computer 102a. Alternatively, the images may be retrieved from the database 108 by the application 114a, either directly or through the server 106. Alternatively, the images may be contained within the application 114a on the computer 102a. FIG. 4A illustrates the main UI 400a of the computer-implemented method or algorithm 200a. As shown, the UI 400a includes an image 402a. The image 402a represents a physical object. In the specific example of FIG. 4A, the image 402a is a digital photograph of loaves of bread, which represents the physical object of bread and could have been taken by someone perusing a store or restaurant serving these loaves of bread and posted to an online social media networking service, for example. Below the image 402a are user interface elements 404a and 404b. Specifically, the user interface elements 404a and 404b allow a user to enter inputs associated with the image 402a, and the corresponding physical object represented by the image, for the user to provide a preference for the physical object represented by the image 402a. For example, the user interface element 404a is an icon of an X, which corresponds to a negative preference, and the user interface element 404b is an icon of a checkmark, which corresponds to a positive preference. The UI 400a also includes a main toolbar 406 that allows the user to navigate within the application 114a. Within the main toolbar 406 are icons corresponding to functions of the application 114a, including a Feed icon 406a, a Restaurants icon 406b, a Crave Search icon 406c, and a My Profile icon 406d. The Crave Search icon 406a initiates a session of the computer-implemented process or algorithm 200a that begins the process or algorithm for analyzing tags associated with a sequence of images presented to a user to present a current interest of the user. Thus, prior to the UI 400a being presented in the display device 112a or the computer 102a, the user, for example, selected the Crave Search icon 406c.

FIG. 4B shows a subsequent user interface after the UI 400a. Specifically, upon the user selecting one of the user interface elements 404a or 404b, the UI 400a transitions to UI 400b. UI 400b includes a new image 402b. Like image 402a, the image 402b represents a physical object. In the specific example of FIG. 4B, the image 402b is a digital photograph of beef stir-fry, which represents the physical object of a food dish of beef stir-fry. By way of example, the user may have selected the user element 404a to indicate that the user has a negative preference (e.g., dislike) for the physical object of bread represented by the image 402a. In response, the computer-implemented method or algorithm 200a determined a next set of tags that does not include tags from the previous set of tags associated with the image 402a, and determined an image (e.g., image 402b) that is associated with the next set of tags to present to the user. Accordingly, the image 402b of the beef stir-fry does not have the same primary tags as the primary tags associated with the image 402a of the loaves of bread.

FIG. 4C shows a subsequent user interface after the UI 400b. The UI 400c of FIG. 4C may be after several rounds of the computer-implemented method or algorithm 200a selecting next sets of tags and images associated with the next sets of tags, and receiving inputs from the user indicating preferences for the physical objects represented by the images. By way of explanation, the UI 400c may be presented after an N number of images were previously presented. Thus, the UI 400c includes a new image 402c. Like images 402a and 402b, the image 402c represents a physical object. In the specific example of FIG. 4C, the image 402b is a digital photograph of sushi, which represents the physical object of a dish of sushi.

FIG. 4D shows a detailed view UI 400d associated with the image 402c in FIG. 4C. By way of example, the UI 400c transitions to the UI 400d by the user selecting the image 402c in the UI 400c. The UI 400d includes the same image 402c in FIG. 4C. In addition, the UI 400d includes user interface elements 408a and 410a. User interface element 408a corresponds to a title or caption associated with the image 402c. The title or caption of the user interface element 408a is a text string that describes the physical object that is represented by the image 402c. By way of example, where the image 402c shows sushi, the user interface element 408a includes the caption California sushi roll. User interface element 410a lists the tags that are associated with the image 402c. The user interface element 410a allows a user to directly see the tags that are associated with the image 402c and, therefore, also associated with the physical object that is represented by the image 402c. By way of example, the user interface element 410a includes the tags sushi, roll, raw, Japanese, vegetable, and cold.

Figure 4E:
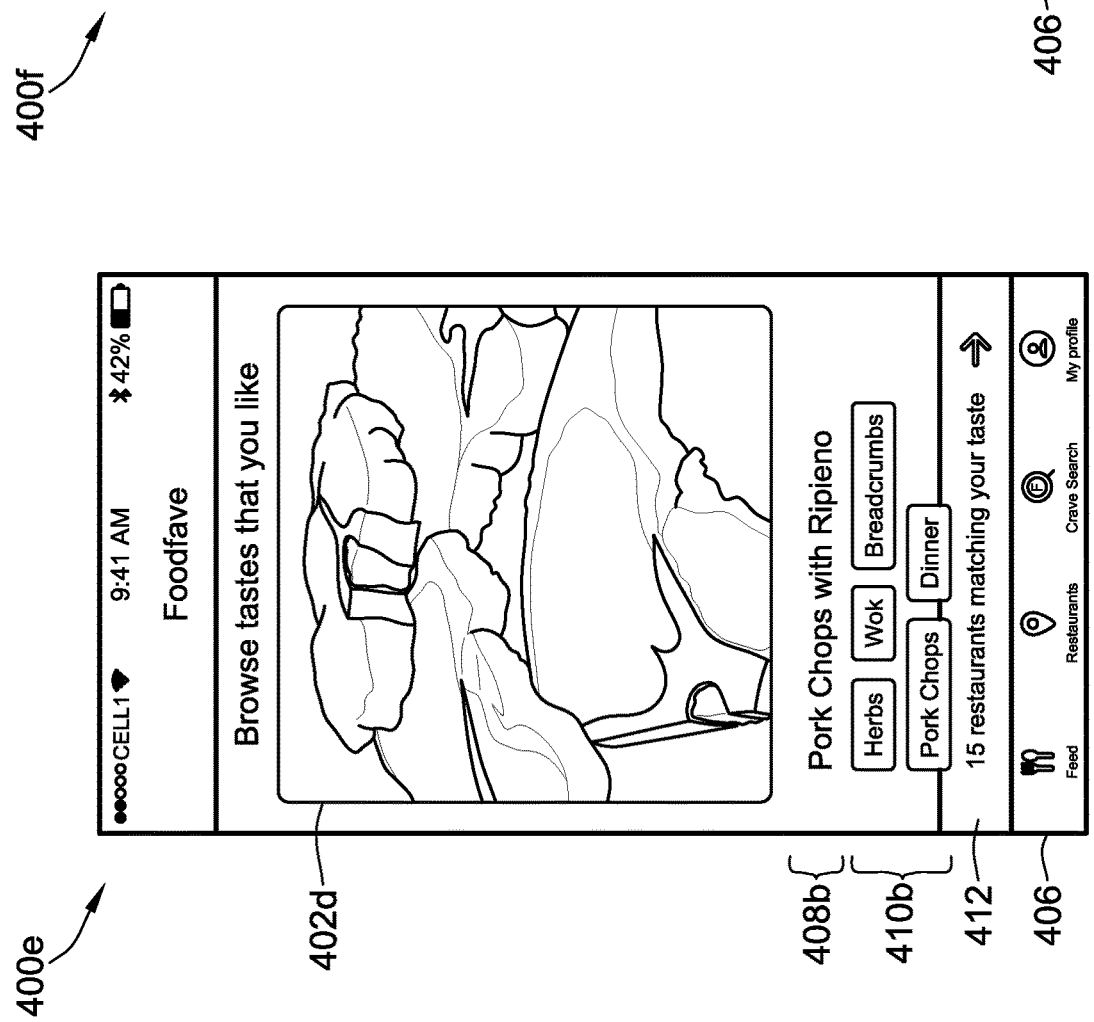
FIG. 4E illustrates another user interface of a computer-implemented method or process of analyzing tags associated with a sequence of images presented to a user to present a current interest of the user according to aspects of the present disclosure.

FIG. 4E shows a UI 400e that includes a recommendation for a restaurant based on the currently presented image 402d, which is presented based on the computer-implemented process or algorithm 200a. For example, the user may have indicated a negative preference or dislike in response to being presented the image 402c. Based on reverting back to the tags that were last associated with a positive response (for example, 402b), the computer-implemented process or algorithm 200a may have determined the image 402d as the next image to present to the user. Similar to the UI 400d, the UI 400e includes a detailed view associated with the currently presented image 402d. As shown, the image 402d shows a digital photograph of pork chops, which is indicated by the user interface element 408b. Specifically, the user interface element 408b shows the caption of Pork Chops with Ripieno. The UI 400e further includes the user interface element 410b, which provides the tags that are associated with the image 402d. As shown, the tags include herbs, wok, breadcrumbs, pork chops, and dinner. Further, the UI 400e includes the user interface element 412. The user interface element 412 provides an indication of a number entities within the area, for example, defined by the location of the user, the computer 102a, or both, that offer the physical object that is associated with the image 402a. Specific to the illustrated example, the user interface element 412 indicates the number of restaurants within the location of the user that offer the food dish that is represented by the image 402d. As shown, there are 15 restaurants within a threshold location of the user that offer the food dish of pork chops with ripieno that is associated with the image 402d.

The user interface element 412 may be presented to the user within the UI 400e in response to the user providing an indication that the user is interested in obtaining the physical object associated with the image 402d. Such an indication can be provided according to various methods, such as the user double tapping or selecting the image 402d. In response, the application 114a presents the user interface element 412 within the UI 400e. Thus, once a user is guided to a physical object that the user is interested in, such as craving in the case of a food dish, the computer-implemented process or algorithm 200a allows the user to obtain information on entities that offer the physical object. In this case, the entities are the 15 restaurants. In response to the user selecting the user interface element 412, the application 114a causes a transition between the UI 400e and the UI 400f.

FIG. 4F shows the UI 400f, which includes a list of recommended entities that offer the physical object that the user indicated as being interested in obtaining additional information in. The UI 400f includes a list of entities 414a-414g, specifically restaurants, that offer the physical object associated with the image 402d. From the UI 400f, the user is able to choose a specific entity from the list of entities 414a-414g. Upon selecting an entity, such as the first entity associated with the first user interface element 414a, the application 114a causes a transition between the UI 400f to the UI 400g.

Figure 4H:
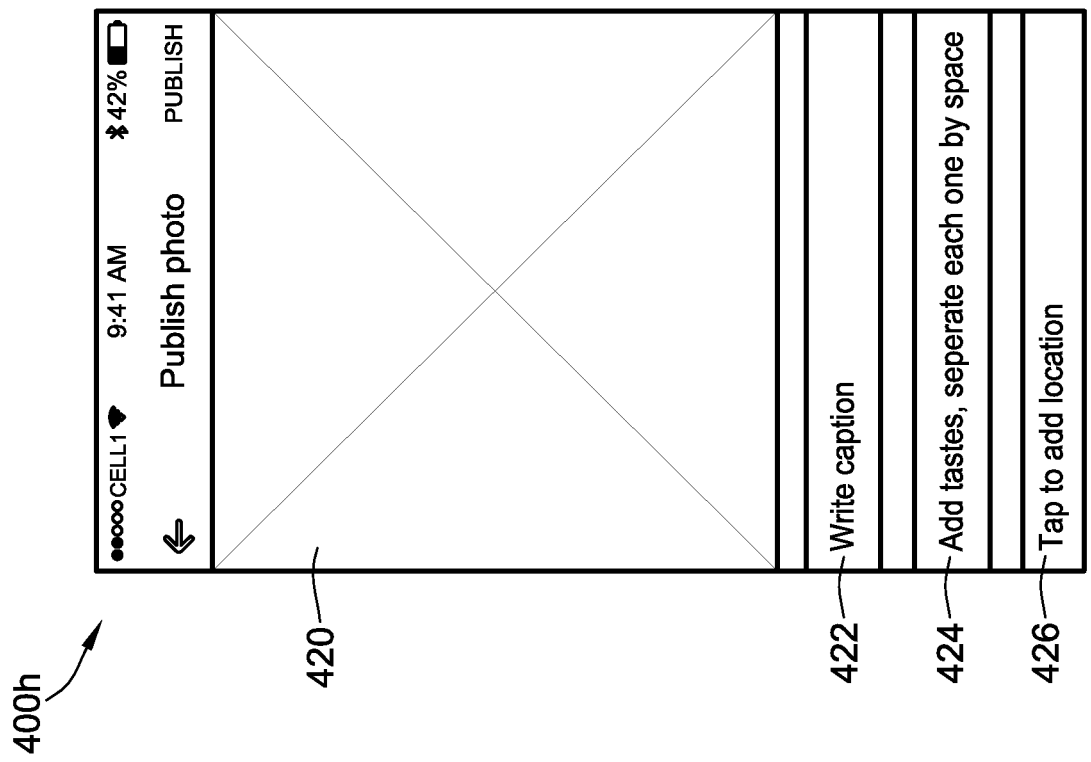
FIG. 4H illustrates a user interface for uploading an image according to aspects of the present disclosure.
Figure 4G:
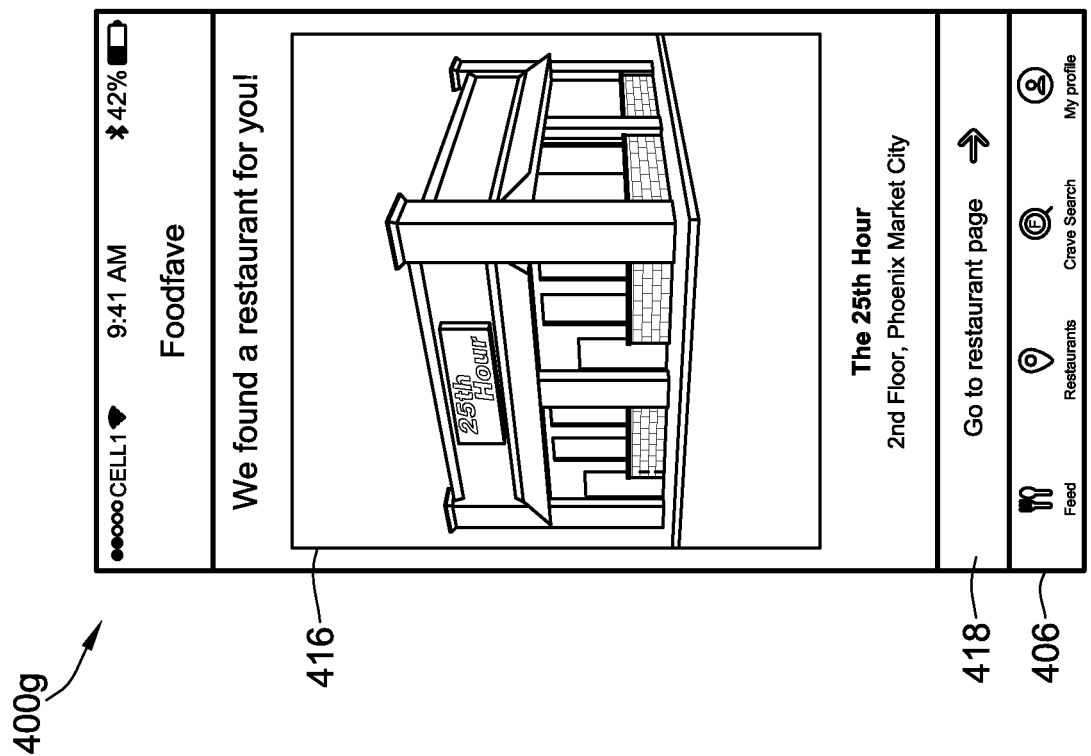
FIG. 4G illustrates another user interface of a computer-implemented method or process of analyzing tags associated with a sequence of images presented to a user to present a current interest of the user according to aspects of the present disclosure.

FIG. 4G shows a UI 400g that provides information regarding a specific entity that offers the physical object associated with the image 402d. In the case of a restaurant, the UI 400g includes an image 416 of the exterior of the restaurant. Below the image 416, the UI 400g includes the name of the restaurant and the address of the restaurant. The UI 400g also includes a user interface element 418. The user interface element 418 can be associated with a hyperlink to a website that is associated with the restaurant. Alternatively, the user interface element 418 may direct the user to a landing site within the application for restaurant. The landing site for the restaurant may provide information regarding the restaurant, such as the information that is contained with the restaurant profile stored within the database 108. According to some embodiments, the landing site for the restaurant may allow a user to purchase the food dish through the application 114a, rather than being directed to an Internet web site from which the user can purchase the food dish.

FIG. 4H shows a UI 400h for a user to upload and associate an image of a physical object into the system 100, such as stored within the database 108 of the system 100. The UI 400h includes an area 420 to display the image that will be associated with the physical object. The image can be obtained according to various methods, such as a camera integrated within the computer 102a, such as in the case of a smartphone, or by linking to an image on the Internet or saved in a memory device of the computer 102a. Similar to the UI 400f, the UI 400h also includes a user interface element 422 that allows a user to insert a title or a caption for the image. The UI 400h also includes a user interface element 424 to associate the image within the area 420 with one or more tags that describe the physical object represented by the image. The UI 400h also includes a user interface element 426 to associate a location with the image and the physical object. The location can either be determined automatically, such as through components and/or modules within the computer 102a (e.g., Global Positioning System receivers), or can be manually entered by the user.

Figure 4I:
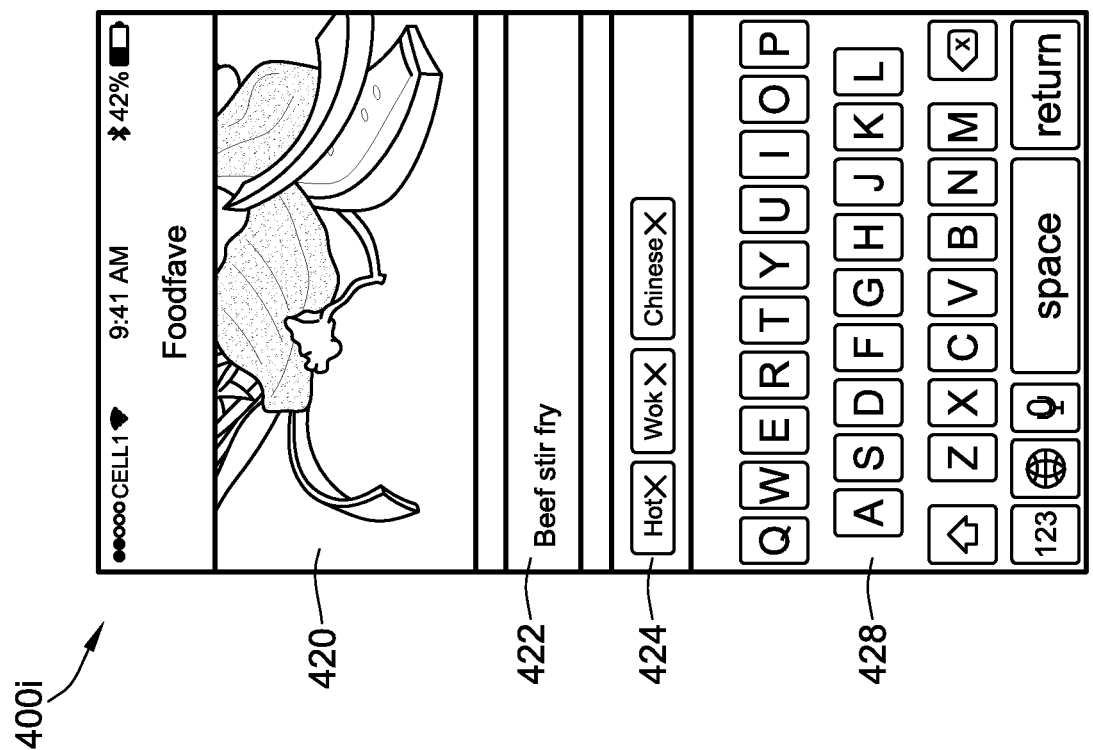
FIG. 4I illustrates another user interface for uploading an image according to aspects of the present disclosure.
Figure 4J:
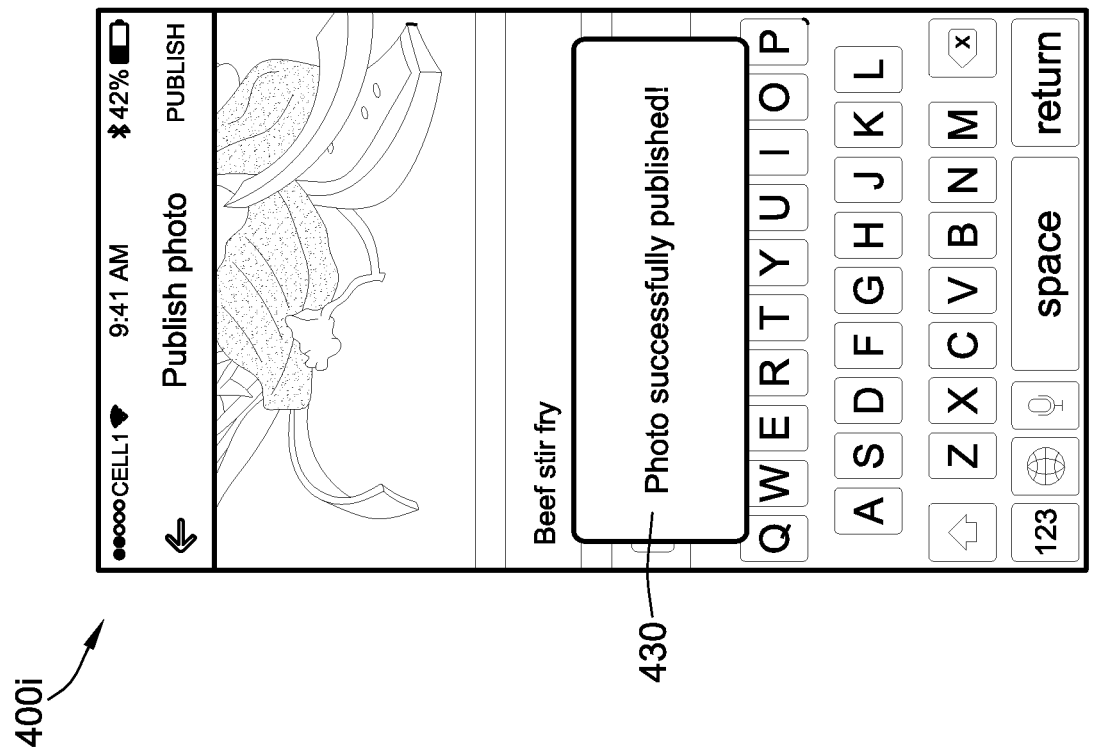
FIG. 4J illustrates another user interface for uploading an image according to aspects of the present disclosure.

FIG. 4I illustrates the UI 400i as the user enters information within the user interface elements 422 and 422. For example, the user may be uploading an image of a food dish. The food dish may specifically be beef stir-fry. The user may have selected the tags hot, wok, and Chinese to describe the food dish (e.g., physical object) represented by the image. To select the tags and enter the caption, the UI 400i includes a virtual keyboard 428. However, the user can enter the text according to various other user interface devices. Once the user has completed entering the information, the image is uploaded to the database 108. FIG. 4J shows the UI 400j that includes the user interface element 430, which indicates a successful upload of the image and the associated information, such as the tags, the caption, and the location.

FIGS. 4K and 4L show user interfaces associated with a user viewing aspects of the user's profile. Specifically, FIG. 4K shows UI 400k associated with a user profile, including the tags that the user is associated with based on the user interface element 432. As shown, the user profile indicates that the user is associated with the tags Talian, Asian, Burger joints, Romantic, Delivery, Music, Healthy food, Fresh, among other tags. The tags are associated with the user by the user manually selecting certain tags from all of the tags that are stored in the database 108 that the user has a positive preference for (e.g., likes). Alternatively, the tags are associated with the user implicitly by the user's interaction with the tags over time, such as the user having the habit of selecting images and/or physical objects that the user prefers that are associated with the tags in the user interface element 432. The UI 400k also includes images (e.g., digital photographs) that the user has provided a positive preference for (e.g., liked) during interaction with the application 114a.

FIG. 4L includes the UI 400l that shows at least some additional aspects of the user's profile. For example, the UI 400l includes user interface elements 436 and 438. The user interface element 436 includes social media information regarding the user, such as an icon of the user, the user's location (e.g., city and state), and how many users the user is following and are following the user. The user interface element 438 includes images that the user has uploaded into the system 100, such as through the flow illustrated in FIGS. 4H-4J. The UI 400l can include other information within the system 100, not just the information specifically referenced herein with respect to FIGS. 4A-4L. For example, the UI 400l can include a feature for users called The Top 100, which highlights the top rated images and/or physical objects associated with the images at any given moment. The Top 100 images can be out of all of the images stored within the database 108, all of the images within the database 100 that are relevant to the user based on the images being associated with tags that the user has liked, or all of the images of physical objects that are offered within a pre-defined area surrounding the user's current location. The images representing the physical objects with the most positive preferences will be featured on The Top 100, which provides users the incentive to upload physical objects (e.g., such as food dishes) that are their favorite physical objects. For example, this will encourage users to share their best meals in the hopes of being in The Top 100. The Top 100 list allows users to gain attention. In the social media realm, the applications 114a, 114b allow users to attract more followers as well as support, for example, their favorite restaurants (e.g., entities). The Top 100 lists will also be active, allowing user to select an image within The Top 100 list to be taken to a page associated with a profile of the entity that offers the physical object represented by the image.

While this disclosure is susceptible to various modifications and alternative forms, specific embodiments or implementations have been shown by way of example in the drawings and will be described in detail herein. It should be understood, however, that the disclosure is not intended to be limited to the particular forms disclosed. Rather, the disclosure is to cover all modifications, equivalents, and alternatives falling within the spirit and scope of the invention(s) as defined by the appended claims.

Each of these embodiments, and obvious variations thereof, is contemplated as falling within the spirit and scope of the claimed invention(s), which are set forth in the following claims. Moreover, the present concepts expressly include any and all combinations and sub-combinations of the preceding elements and aspects.

What is claimed is:

1. A computer-implemented method comprising:
   providing a pool of tags, each tag of the pool of tags representing an attribute of a possible interest of the user;
   providing a plurality of electronic images stored on one or more computer devices, each electronic image of the plurality of electronic images representing one or more of the possible interests of the user and being associated with a corresponding set of tags from the pool of tags;
   transmitting, from the one or more computer devices, first electronic images of the plurality of electronic images to an electronic device associated with a user;
   receiving, by the one or more computer devices, an input associated with at least one of the first electronic images from the user indicating one or more preferences;
   processing, by the one or more computer devices, at least a subset of the pool of tags based on the one or more preferences and a corresponding set of tags for the at least one of the first electronic images to generate one or more next set of tags, the processing comprising:
      determining weightings of tags from the at least the subset of the pool of tags based, at least in part, on a number of times each tag of the tags from the at least the subset of the pool of tags is associated with at least one of a positive preference or a negative preference by the user, the each tag of the tags from the at least the subset of the pool of tags being associated with at least one positive preference and at least one negative preference by the user; and
      determining the one or more next set of tags based on the one or more next set of tags including at least one tag of the tags from the at least the subset of the pool of tags, wherein the one or more next set of tags includes a highest weighted tag from the at least the subset of the pool of tags;
   determining, by the one or more computer devices, one or more next electronic images from the plurality of electronic images associated with the one or more next set of tags in response to the one or more preferences including a negative preference, the one or more next electronic images representing one or more next possible interests of the user, and the one or more next set of tags describing or characterizing attributes of the one or more next possible interests represented by the one or more next electronic images; and
   generating a sequence by repeating the transmitting, the receiving, the processing, and the determining with the one or more next electronic images in place of the at least one of the first electronic images a plurality of times during a session until the user indicates at least one electronic image of the one or more next electronic images is a current interest of the user.

2. The method of claim 1, in response to the input for the one or more preferences associated with the at least one of the first electronic images being negative, further comprising negatively weighting each tag of the corresponding set of tags from the pool of tags.

3. The method of claim 2, wherein the negative weighting of at least one tag from the corresponding set of tags removes the at least one tag from the subset of the pool of tags for at least one iteration of the generating of the sequence.

4. The method of claim 2, wherein the negative weighting of at least one tag from the corresponding set of tags removes the at least one tag from the subset of the pool of tags from a remainder of the session of determining the current interest of the user.

5. The method of claim 1, further comprising:
   determining one or more interactions of the user with the first electronic images, one or more tags from the pool of tags, or a combination thereof,
   wherein the weighting is based, at least in part, on the one or more interactions.

6. The method of claim 1, in response to the input for the one or more preferences associated with the at least one of the first electronic images being positive, further comprising positively weighting each tag of the corresponding set(s) of tags from the pool of tags.

7. The method of claim 1, further comprising determining, by the one or more computer devices, a plurality of tags specific to the user, from among the pool of tags, based on each tag of the plurality of tags specific to the user being associated with a profile of the user.

8. The method of claim 1, wherein the processing, by the one or more computer devices, is of at least a subset of the plurality of tags specific to the user from among the pool of tags.

9. The method of claim 1, wherein the weighting is based, at least in part, on the profile of the user.

10. One or more computer-readable, non-transitory, storage media encoding machine-readable instructions that, when executed by one or more computers, cause operations to be carried out, the operations comprising:
    providing a pool of tags, each tag of the pool of tags representing an attribute of a possible interest of the user;
    providing a plurality of electronic images stored on one or more computer devices, each electronic image of the plurality of electronic images representing one or more of the possible interests of the user and being associated with a corresponding set of tags from the pool of tags;
    transmitting, from the one or more computer devices, first electronic images of the plurality of electronic images to an electronic device associated with a user;
    receiving, by the one or more computer devices, an input associated with at least one of the first electronic images from the user indicating one or more preferences;
    processing, by the one or more computer devices, at least a subset of the pool of tags based on the one or more preferences and a corresponding set of tags for the at least one of the first electronic images to generate one or more next set of tags, the processing comprising:
       determining weightings of tags from the at least the subset of the pool of tags based, at least in part, on a number of times each tag of the tags from the at least the subset of the pool of tags is associated with at least one of a positive preference or a negative preference by the user, the each tag of the tags from the at least the subset of the pool of tags being associated with at least one positive preference and at least one negative preference by the user; and determining the one or more next set of tags based on the one or more next set of tags including at least one tag of the tags from the at least the subset of the pool of tags, wherein the one or more next set of tags includes a highest weighted tag from the at least the subset of the pool of tags;

determining, by the one or more computer devices, one or more next electronic images from the plurality of electronic images associated with the one or more next set of tags in response to the one or more preferences including a negative preference, the one or more next electronic images representing one or more next possible interests of the user, and the one or more next set of tags describing or characterizing attributes of the one or more next possible interests represented by the one or more next electronic images; and generating a sequence by repeating the transmitting, the receiving, the processing, and the determining with the one or more next electronic images in place of the at least one of the first electronic images a plurality of times during a session until the user indicates at least one electronic image of the one or more next electronic images is a current interest of the user.

11. The media of claim 10, in response to the input for the one or more preferences associated with the at least one of the first electronic images being negative, further comprising negatively weighting each tag of the corresponding set of tags from the pool of tags.

12. The media of claim 11, wherein the negative weighting of at least one tag from the corresponding set of tags removes the at least one tag from the subset of the pool of tags for at least one iteration of the generating of the sequence.

13. The media of claim 11, wherein the negative weighting of at least one tag from the corresponding set of tags removes the at least one tag from the subset of the pool of tags from a remainder of the session of determining the current interest of the user.

14. The media of claim 10, further comprising:
determining one or more interactions of the user with the first electronic images, one or more tags from the pool of tags, or a combination thereof,
wherein the weighting is based, at least in part, on the one or more interactions.

15. The media of claim 10, in response to the input for the one or more preferences associated with the at least one of the first electronic images being positive, further comprising positively weighting each tag of the corresponding set(s) of tags from the pool of tags.

16. The media of claim 10, further comprising determining, by the one or more computer devices, a plurality of tags specific to the user, from among the pool of tags, based on each tag of the plurality of tags specific to the user being associated with a profile of the user.

17. The media of claim 10, wherein the processing, by the one or more computer devices, is of at least a subset of the plurality of tags specific to the user from among the pool of tags.

18. The media of claim 10, wherein the weighting is based, at least in part, on the profile of the user.

* * * * *